United States Patent [19]

Shimizu

[11] Patent Number: 4,866,595
[45] Date of Patent: Sep. 12, 1989

[54] IMAGE RECORDING SYSTEM FOR IMAGE RECORDING IN RESPONSE TO SIGNALS ENTERED FROM A RECORDING INFORMATION GENERATING UNIT

[75] Inventor: Haruo Shimizu, Yokohama, Japan

[73] Assignee: Canon Kabushiki Kaisha, Tokyo, Japan

[21] Appl. No.: 282,894

[22] Filed: Dec. 12, 1988

Related U.S. Application Data

[60] Continuation of Ser. No. 169,216, Mar. 16, 1988, abandoned, which is a division of Ser. No. 867,901, May 20, 1986, Pat. No. 4,786,923, which is a continuation of Ser. No. 528,211, Aug. 31, 1983, abandoned.

[30] Foreign Application Priority Data

| Sep. 7, 1982 [JP] | Japan | 57-154485 |
| Sep. 7, 1982 [JP] | Japan | 57-154486 |
| Sep. 7, 1982 [JP] | Japan | 57-154487 |
| Sep. 22, 1982 [JP] | Japan | 57-164128 |

[51] Int. Cl.⁴ .......................................... G01D 15/00
[52] U.S. Cl. ...................................... 346/154; 346/160
[58] Field of Search .................. 346/154, 160, 136; 355/14 SH, 3 SH; 358/268, 300; 400/595, 600; 364/518–523; 226/118, 9

[56] References Cited

U.S. PATENT DOCUMENTS

| 4,489,278 | 12/1984 | Sawazaki | 346/154 |
| 4,794,413 | 12/1988 | Yamazaki et al. | 346/154 |

FOREIGN PATENT DOCUMENTS 3617433 5/1986 Fed. Rep. of Germany .
1444216 2/1975 United Kingdom .

Primary Examiner—Arthur G. Evans
Attorney, Agent, or Firm—Fitzpatrick, Cella, Harper & Scinto

[57] ABSTRACT

A recording apparatus is controlled by a recording information generating unit, so that the recording apparatus may be adapted to various recording information generating units. This is achieved by a signal generating unit which generates either a signal for requesting the information transmission from the recording information generating unit, or a signal for demanding the start of information recording.

14 Claims, 28 Drawing Sheets

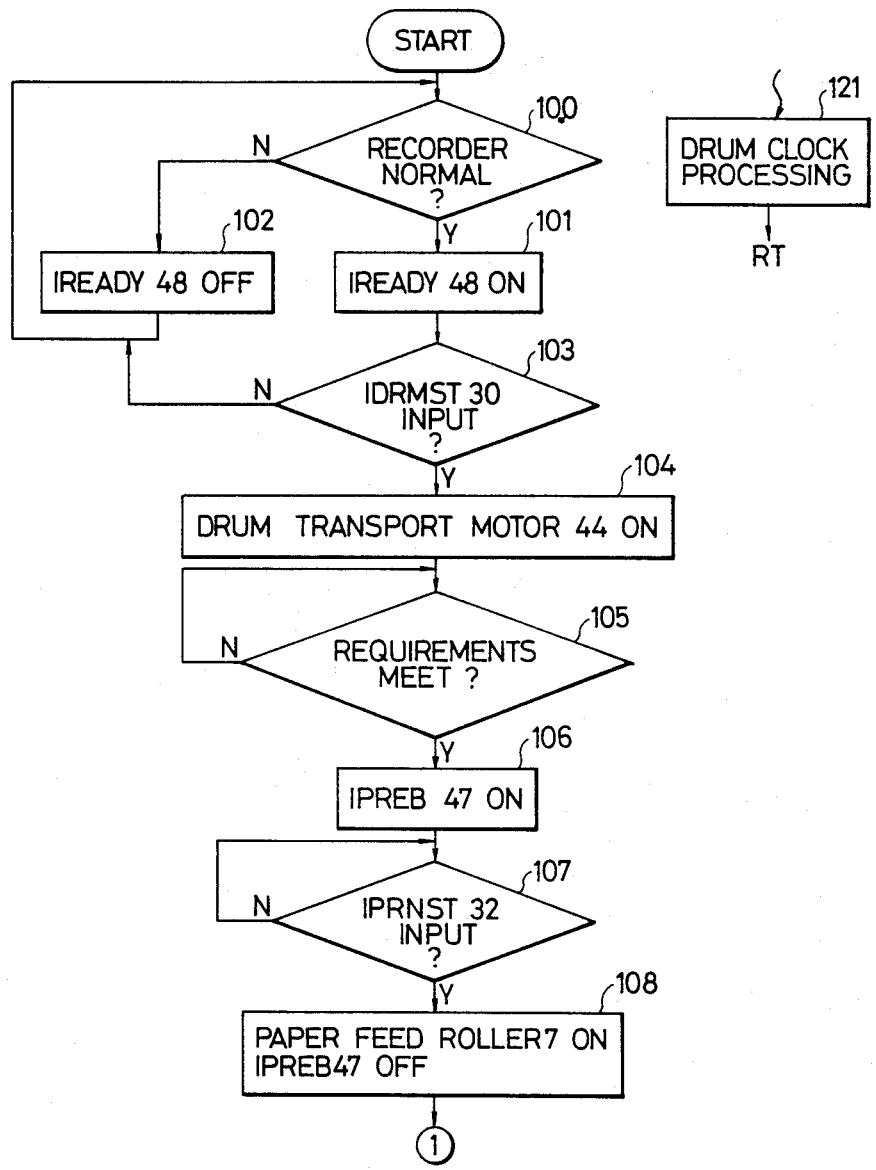

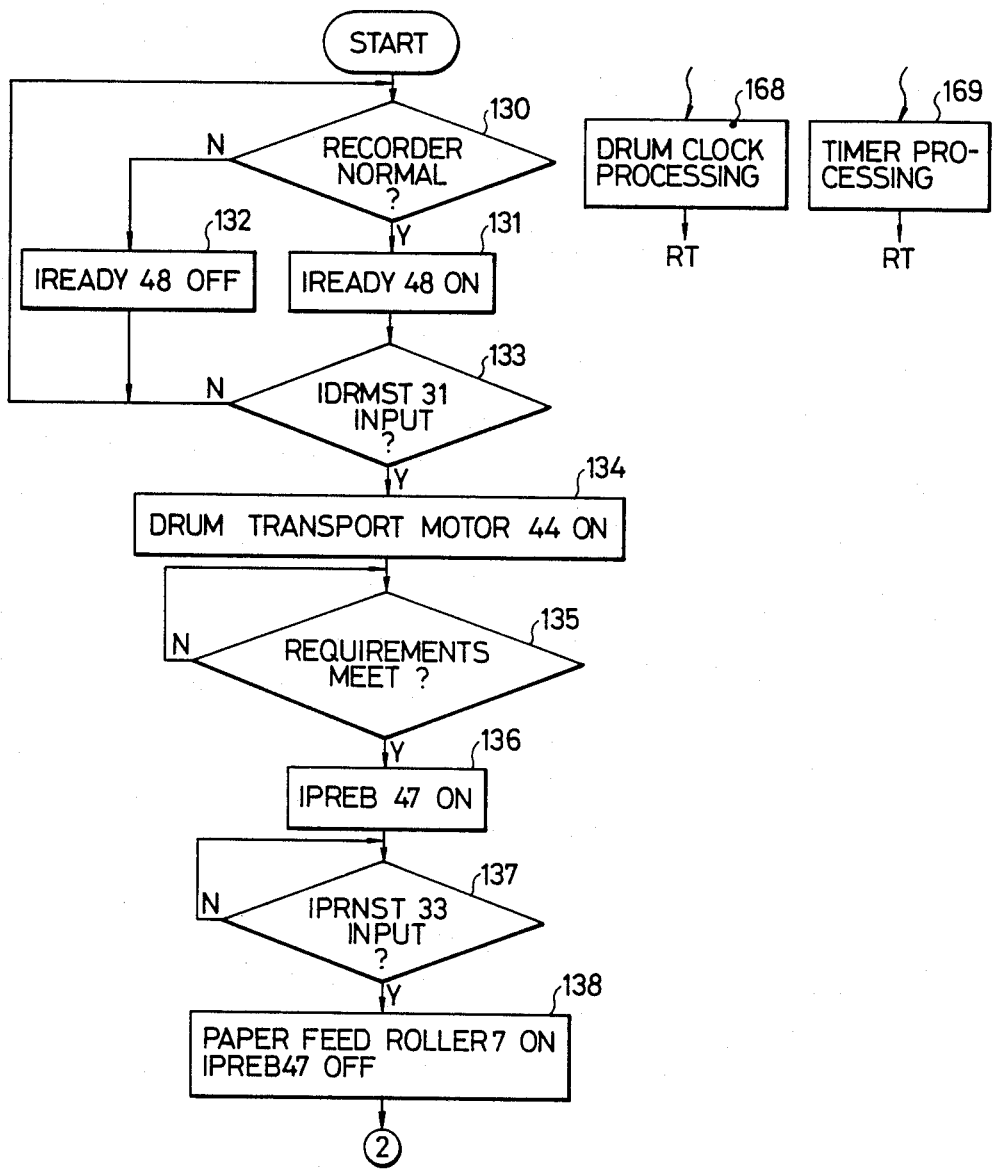

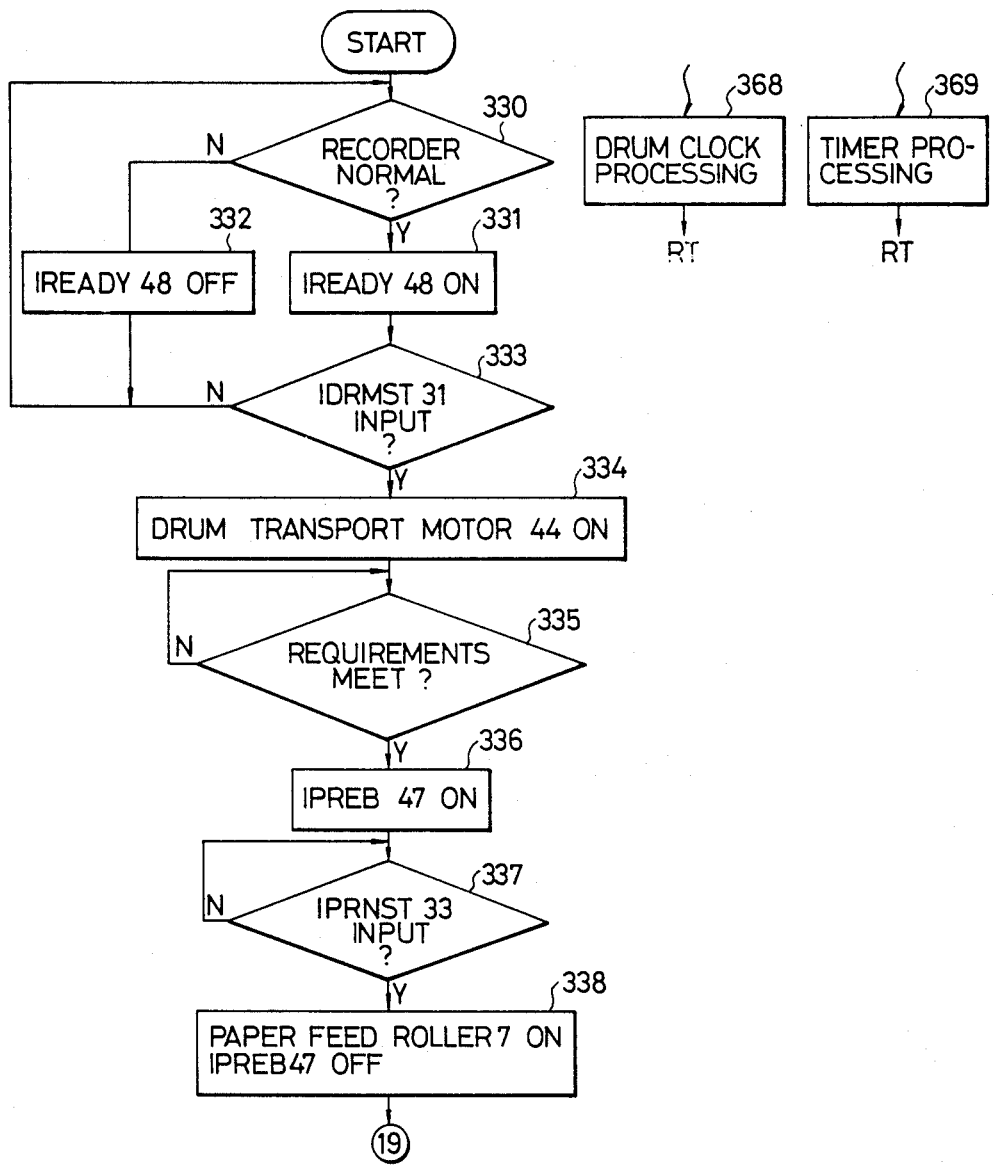

IMAGE RECORDING SYSTEM FOR IMAGE RECORDING IN RESPONSE TO SIGNALS ENTERED FROM A RECORDING INFORMATION GENERATING UNIT

This application is a continuation-in-part continuation division, of application Ser. No. 169,216 filed March 16, 1988, now abandoned which was a division of application Ser. No. 867,901 filed May 20, 1986, now U.S. Pat. No. 4,786,923, which was a continuation of application Ser. No. 528,211 filed Aug. 31, 1983, now abandoned.

BACKGROUND OF THE INVENTION

1. Field of the Invention

The present invention relates to a recording apparatus for image recording in response to signals entered from a recording information generating unit.

2. Description of the Prior Art

Processes for recording information in response to recording information signals can be largely classified into page printing process and line printing process. In the page printing process, the recording information generating unit is equipped with memory means of a capacity corresponding to at least one page of the recording sheet, and the feeding of a recording sheet to the recording unit is initiated when the recording information for a page is ready. When a recording sheet arrives at an image recording position, the recording unit requests, to the recording information generating unit, the start of transmission of the recording information for example by a vertical synchronization signal. The information recording is thereafter conducted by transmitting the information for a page in response to transmission timing signals, for example horizontal synchronization signals, released by the recording unit.

In case of printing information read from an original with such printing process, there are inevitably involved an increased cost and a long printing time, since the information has to be once stored in the page memory prior to the information recording.

On the other hand, in the line printing process in which the information is recorded simultaneously with reading from an original, the start of information reading has to be synchronized with the start of information recording, so that the structure of the recording apparatus inevitably becomes complicated and the output format of the information recording cannot be modified.

Also in the line printing process, the entry of recording information into a memory may sometimes be hindered for example due to noise, after the recording information generating unit releases an instruction for starting the sheet feeding. In such case the recording sheet remains in the recording apparatus because the recording unit does not receive the signal for starting the information recording. It has therefore been necessary for the operator to remove the recording sheet each time such situation occurs.

SUMMARY OF THE INVENTION

An object of the present invention is to avoid the drawbacks mentioned above.

Another object of the present invention is to provide a recording apparatus in which the image recording is principally governed by the recording information generating unit.

Still another object of the present invention is to provide a recording apparatus capable of selecting recording information generating units.

Still another object of the present invention is to provide a recording apparatus in which the recording unit is not affected by a trouble in the recording information generating unit.

Still another object of the present invention is to provide a recording apparatus capable of effectively using recording sheets.

Still another object of the present invention is to provide a recording apparatus in which the structure of the recording information generating unit is simplified.

Still another object of the present invention is to provide a recording apparatus enabling image recording even in combination with a recording information generating unit of a different type.

Still another object of the present invention is to provide a recording apparatus capable of automatically discharging a recording sheet remaining in the recording unit and starting a new recording operation after signalling said discharge, thereby avoiding cumbersome handling of the recording sheet remaining in the recording unit.

Still another object of the present invention is to provide a recording apparatus capable of detecting the presence of a recording sheet in case it remains in the recording unit, and automatically enabling a new recording operation, thereby reducing the time required for sheet feeding.

Still another object of the present invention is to provide a recording apparatus which can be utilized as a real-time printer for use in a reader for reading an original and converting information into electric signals, and as a printer for a large-capacity memory such as an electronic file.

Still other objects of the present invention will become fully apparent from the following description to be taken in conjunction with the attached drawings and also from the appended claims.

DETAILED DESCRIPTION OF THE PREFERRED EMBODIMENTS

Now the present invention will be explained in detail by an embodiment thereof shown in the attached drawings.

Figure 2:
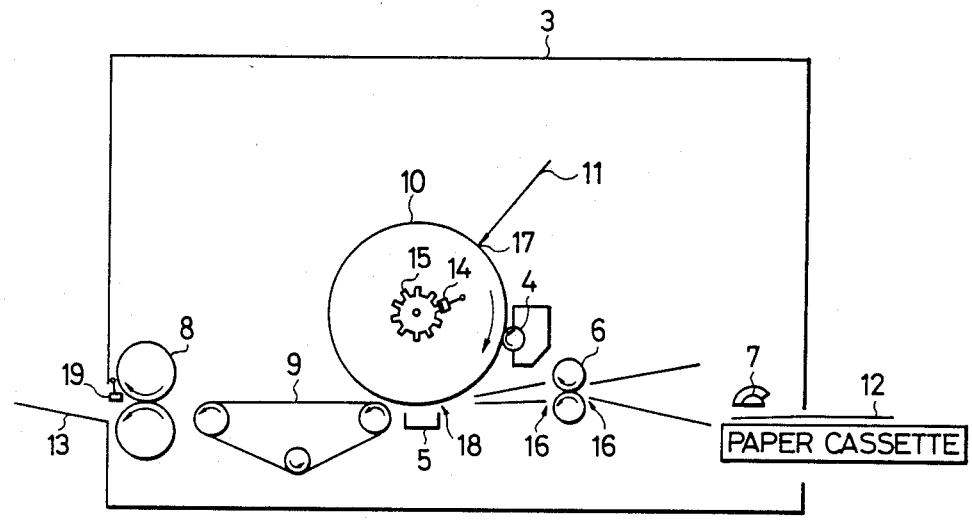
FIG. 2 is a schematic cross-sectional view of a recording unit principally showing a sheet feeding system.

The present embodiment constitutes a recording apparatus utilizing laser beam printing process, of which a recorder 3 is shown in a cross-sectional view in FIG. 2. A photosensitive member 10, for example a photosensitive drum, subjected to primary charging with an unrepresented charger, is exposed to a laser beam 11 modulated with recording signals to form a latent image, which is developed into a visible image in a developing unit 4. The visible image on said photosensitive drum 10 is transferred onto a sheet 12 by means of a transfer unit 5, and said sheet 12 then passes between fixing rollers 8 to fix the visible image thereon. After said fixation the sheet is discharged onto a tray 13, and the recording operation on the sheet is thus completed. There are also provided a paper feed roller 7 for feeding the recording sheet from a cassette into the recording apparatus, and a registration or regist. roller 6 for correcting the sheet position and also for adjusting the position of the leading end of an image as will be explained later.

Figure 3:
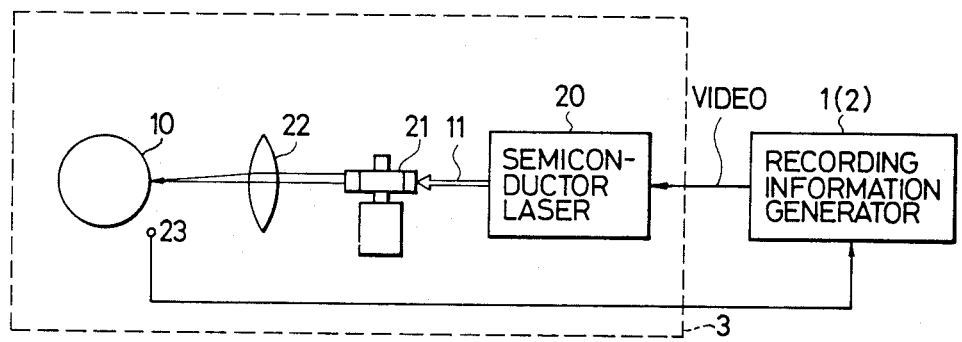
FIG. 3 is a block diagram of a recording unit showing the recording process.
Figure 4:
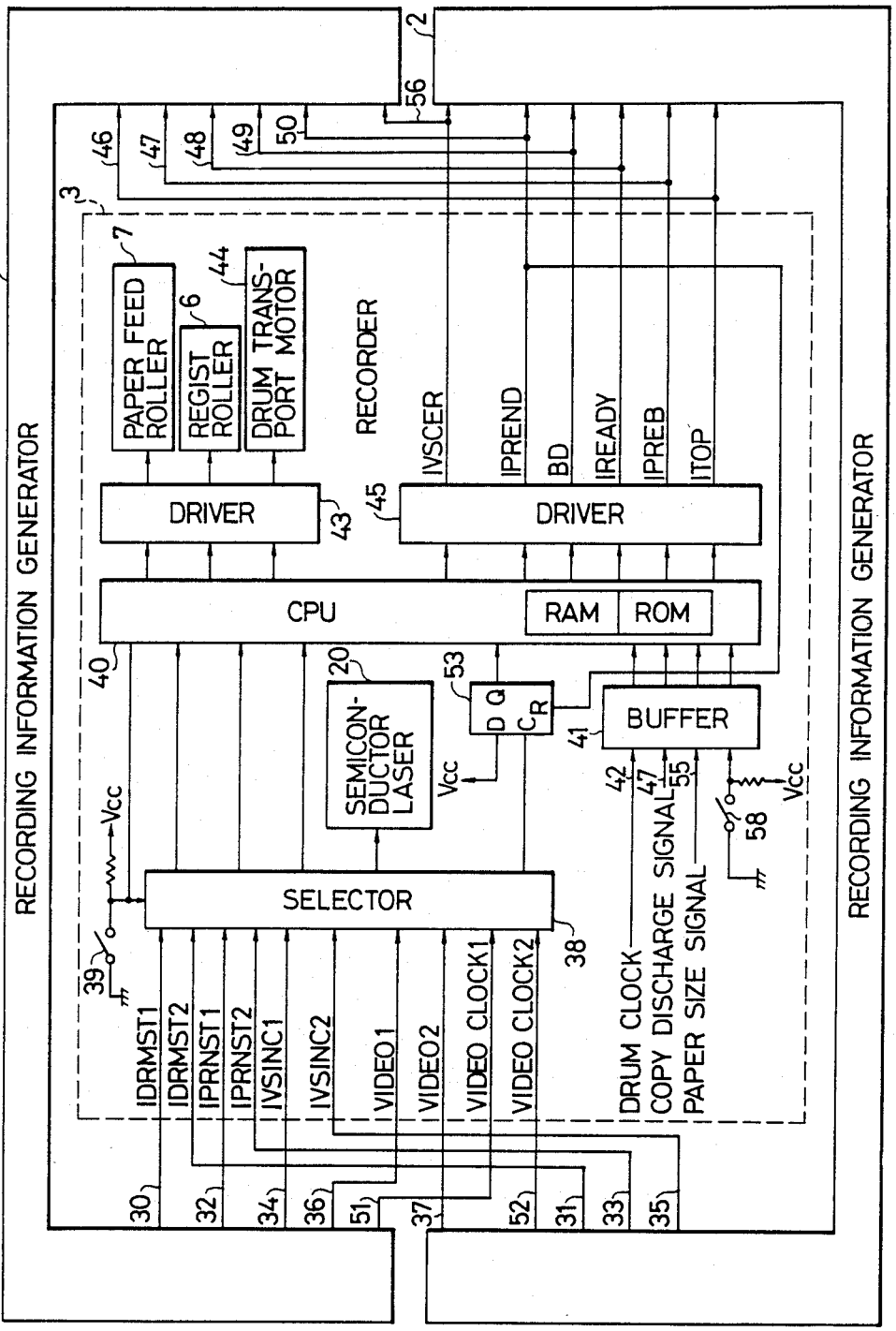
FIG. 4 is a block diagram of a recording apparatus in which the recording information generator selecting means is incorporated in the recording unit.
Figure 5:
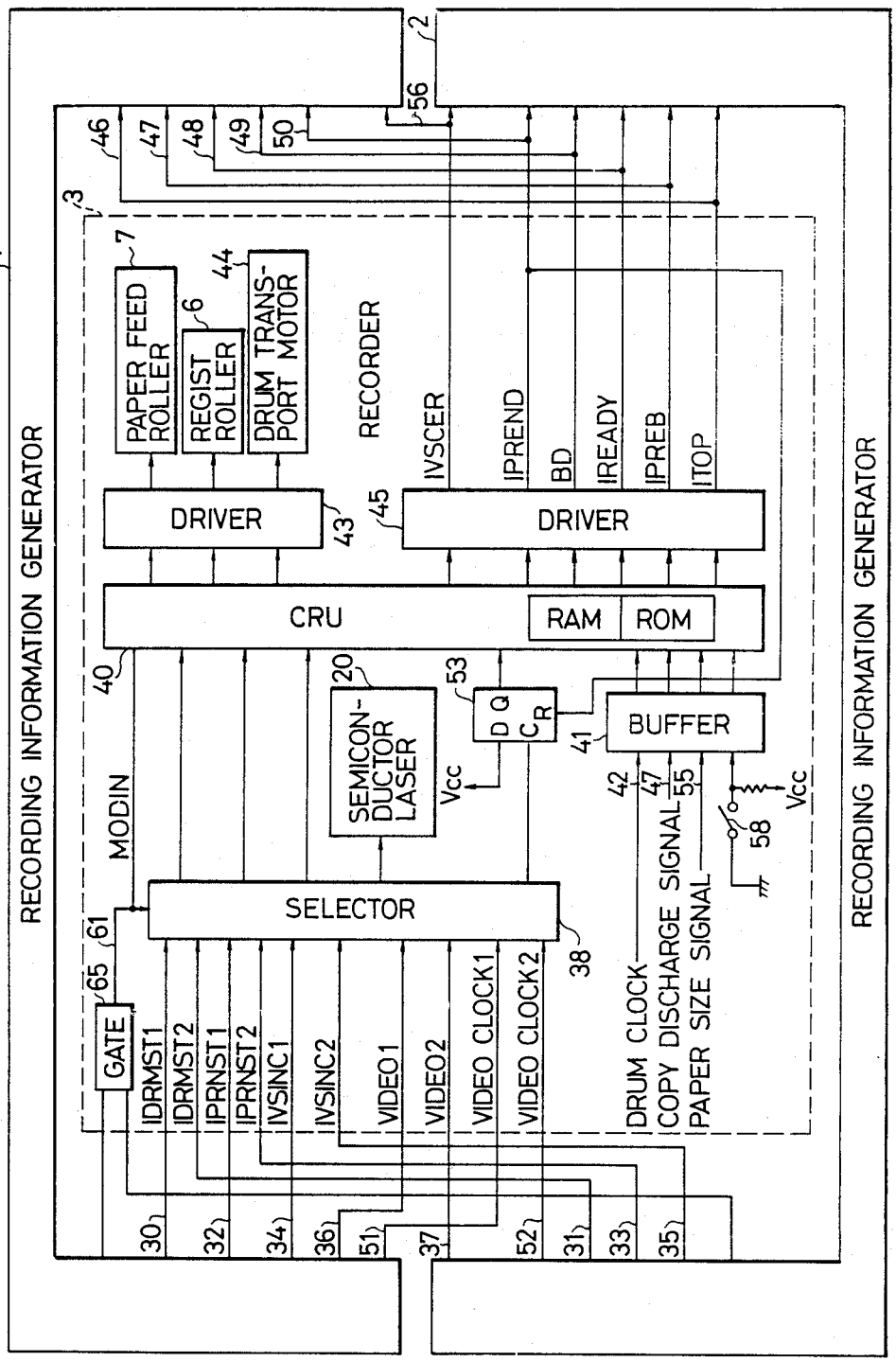
FIG. 5 is a block diagram of a recording apparatus in which the recording information generator selecting means is incorporated in the recording information generators.
Figure 6:
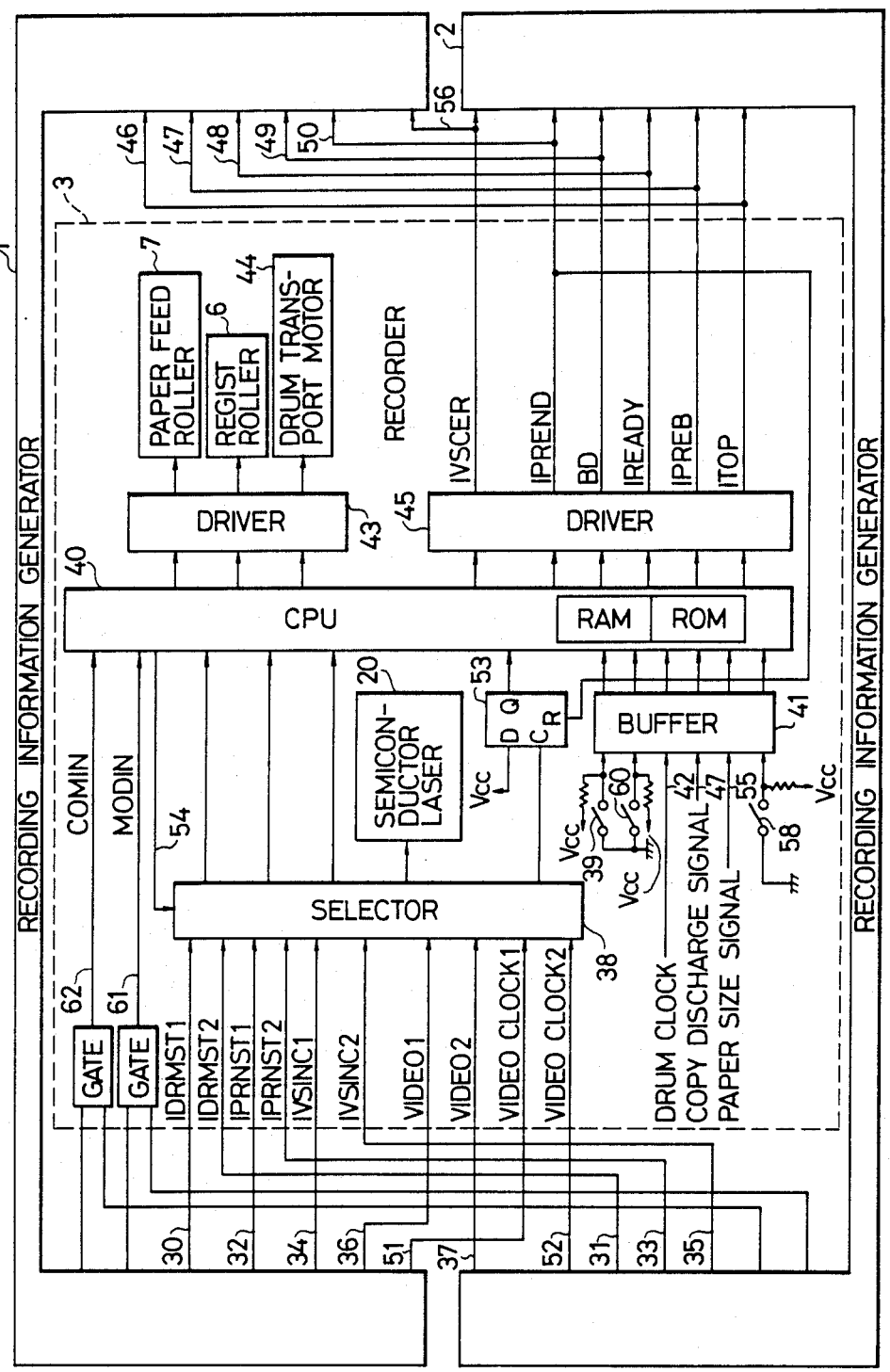
FIG. 6 is a block diagram of a recording apparatus in which the recording information generator selecting means is incorporated in the recording unit and in the recording information generator with determined priority of selection.

FIG. 3 illustrates the process for recording information onto the photosensitive drum 10. A recording information generator 1 (or 2) generates image signals VIDEO to be recorded. The generator 1 represents, for example, an electronic file equipped with a large-capacity memory storing image information for plural pages or a disk storing printing data in the form of codes, and the generator 2 represents, for example, a reader for reading an original image and converting the information into image signals. Said signals VIDEO are used for driving a semiconductor laser 20 to generate a modulated laser beam. The beam from the semiconductor laser 20 is deflected by a scanner 21 and focused by a lens 22 onto the photosensitive drum 10. In order to synchronize the laser beam scanning the photosensitive drum 10 with the image signals, the beam position is detected by a beam detector 23 immediately before the photosensitive drum 10 is scanned by the laser beam. The beam detector 23 generates a beam detection signal BD, which is transmitted to the recording information generator 1 (or 2) for synchronization in the horizontal direction. Although the present embodiment is explained in the context of a recording apparatus utilizing laser beam printing process, it will be understood that the present invention is applicable also to other recording apparatus, for example a thermal printer or an ink jet printer. FIG. 4 is a block diagram of a recording apparatus provided with selecting means in the recording unit 3. In said recording apparatus a selector switch 39 in the recording unit 3 selects the recording information generator 1 or 2 and causes a selector 38 to transmit those signals emitted by the thus selected recording information generator. The selector switch 39 also instructs a microcomputer (CPU) 40 whether a signal requesting the start of image recording (a vertical synchronization signal or an image recording start signal) is emitted from the recorder 3 or from the recording information generator 1 (or 2). Stated differently, said selector switch 39 is utilized for selecting either a mode (ITOP synchronization mode) in which the request for starting image recording is made by a vertical synchronization signal ITOP emitted from the recorder 3, or another mode (IVSINC synchronization mode) in which said request is made by an image recording start signal IVSINC emitted from the recording information generator 1 (or 2). The signal IVSINC represents the start of image signals from the reader, and the recorder 3 in this mode records the image signals on a real-time basis during the scanning operation of the reader. FIG. 5 is a block diagram of a recording apparatus in which the recording information generator is provided with the aforementioned selecting means such as a selector switch, wherein a signal MODIN 61 is supplied to the selector 38 and the CPU 40. Said signal MODIN 61 performs the same function as that of the signal from the selector switch 39 shown in FIG. 4. FIG. 6 is a block diagram of a recording apparatus in which the recorder 3 and the recording information generator 1, 2 are provided with selecting means, wherein a signal COMIN 62 and a COMIN switch 60 are utilized for respectively enabling the signal MODIN 61 and the signal from the selector switch 39. In case the signal COMIN 62 and the COMIN switch 60 are both in the enabled state, the CPU 40 receives a signal from a priority switch 58 and controls an input signal 54 to the selector 38 so as to enable signals to which the priority is given by said signal of the priority switch. In case either one of the signal COMIN 62 and the COMIN switch 60 is in the enabled state, the CPU controls the input signal 54 to the selector 38 according to such enabling signal. In case both the signal COMIN 62 and the COMIN switch 60 are not in the enabled state, the CPU 40 controls the input signal 54 to the selector 38 so as to enable the signals of a priority mode previously determined, or the signals indicated by the priority switch 58. In the present block diagram the priority switch 58 is provided in the recorder 3, but a similar control procedure is realized even if said switch 58 is positioned in the recording information generator 1 or 2 and transmits a signal to the recorder 3. The selector 38 selects either a signal VIDEO1 36 or a signal VIDEO2 37 for introducing into the semiconductor laser 20. Drum clock signal 42 supplied to the CPU 40 is generated by a sensor unit 14 when a gearshaped plate 15 mounted on the photosensitive drum 10 shown in FIG. 2 intermittently intercepts a light beam. Status signals ITOP (46), IPREB (47), IREADY (48), BD (49), IPREND (50) and IVSCER (56), indicating the states in the recorder 3, are supplied to the recording information generator 1, 2.

Now there will be given an explanation on the control procedure of the present embodiment, while making reference to the attached control flow charts and timing charts. Said control flow charts represent control programs stored in a read-only memory (ROM) in the CPU 40. In the following description reference is made to FIG. 4, since the control procedures shown in FIGS. 4 to 6 are essentially same. It is also assumed that the recording information generator 1 functions in the ITOP synchronization mode, while the recording information generator 2 functions in the IVSINC synchronization mode.

Figure 7:
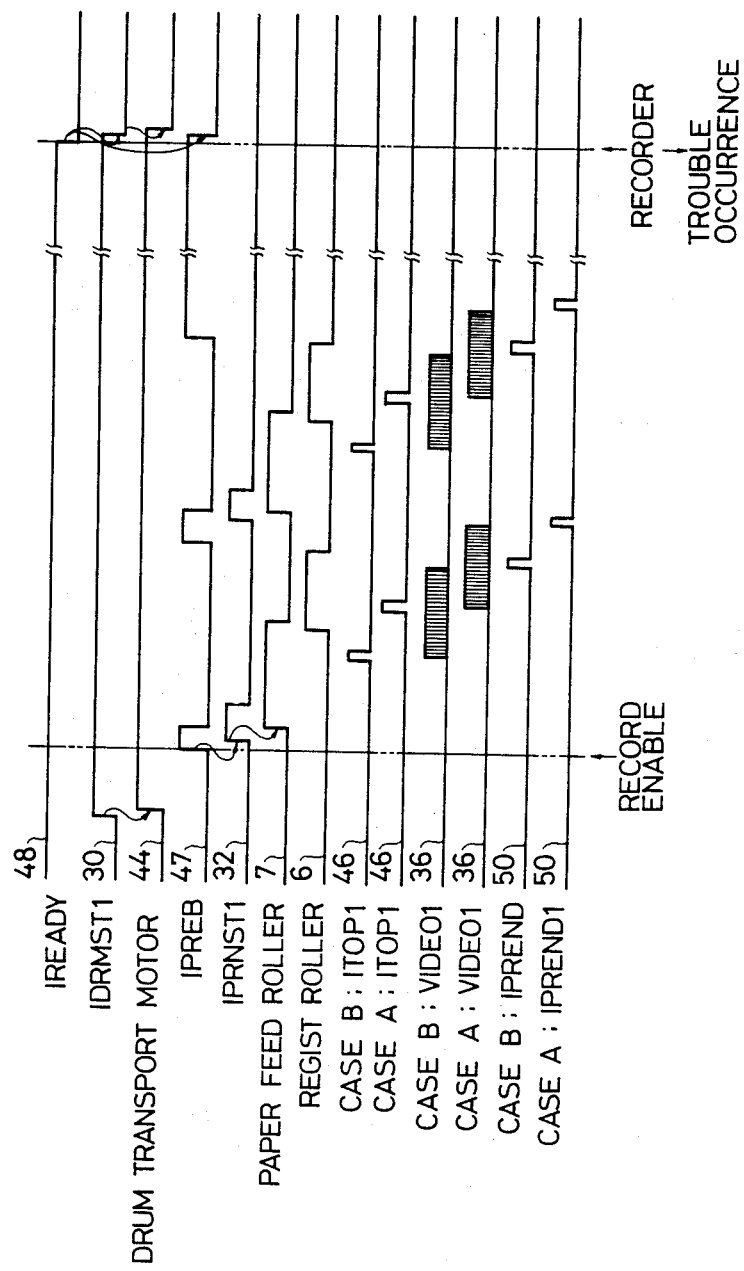
FIG. 7 is a timing chart in an ITOP synchronization mode.
Figure 9B:
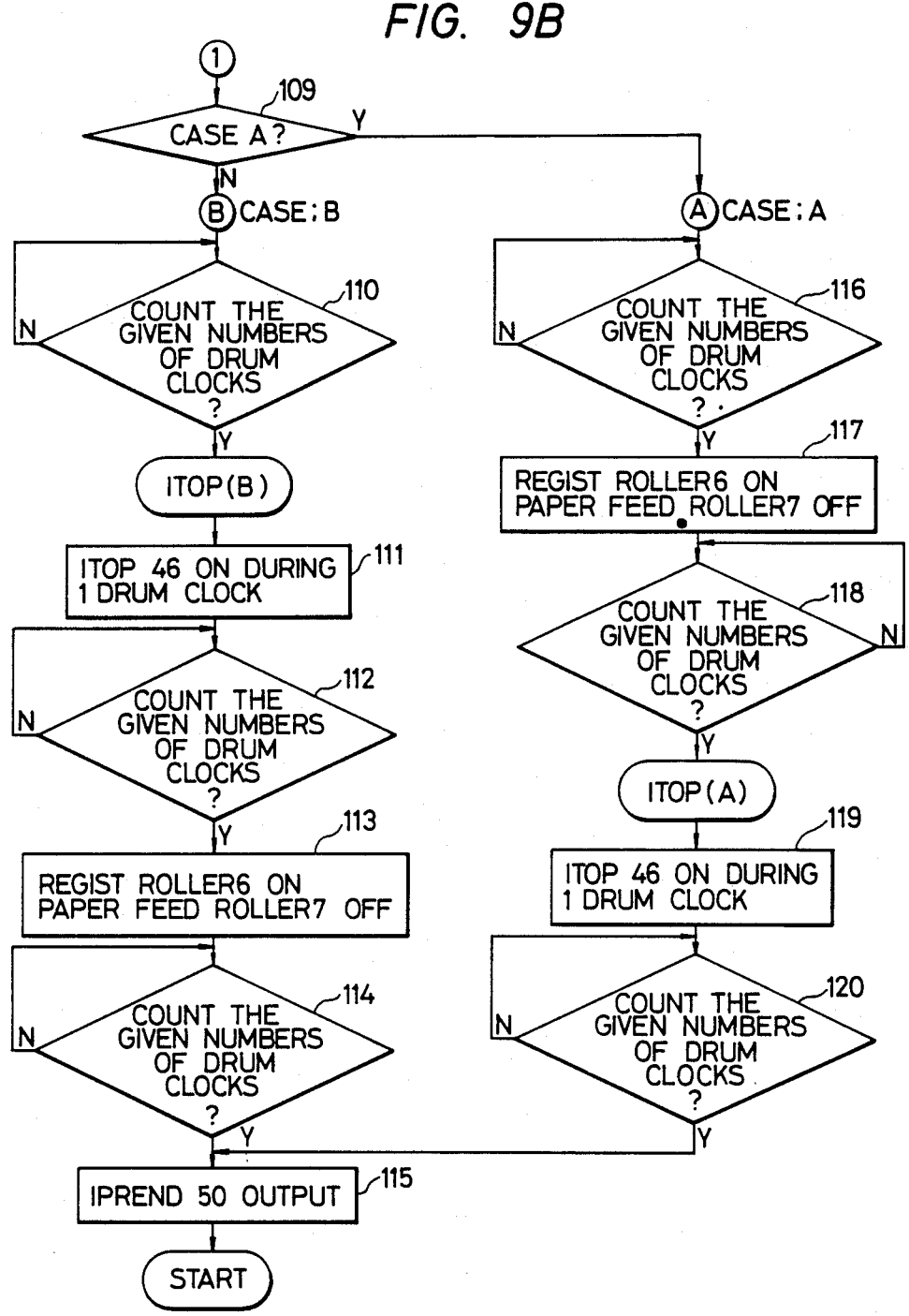
FIG. 9 composed of FIG. 9A and 9B is a flow chart in the ITOP synchronization mode.

FIG. 7 shows the function timing in the ITOP synchronization mode, and FIG. 9 shows the corresponding flow chart. The recording information generator usable in the ITOP synchronization mode is for example a laser beam printer or an electronic file, either of which is equipped with a page memory.

Now reference is made to FIGS. 7 and 9. When the recorder 3 has no abnormality therein and is ready for recording, the program proceeds from a step 100 to a step 101 to release a signal IREADY (48), thus advising the recording information generator 1 of the availability of the recorder 3. In case the recording information generator 1 is to start the recording, presence of a signal IREADY (48) from the recorder 3 is confirmed when recording information for a page is stored in a memory in the recording information generator, and a signal IDRMST (30) for initiating or instructing drum rotation is supplied to the recorder 3. In response to said signal 30 (step 103), if the signal IREADY is present and the recorder 3 is normal, a drum motor 44 is driven through a driver 43 to rotate the drum 10 (step 104). After the control of the potential on the photosensitive drum 10 and upon completion of the preparation for starting the recording operation, the CPU 40 releases, through a driver 45, the signal IPREB (47) enabling the start of recording operation (steps 105, 106). In response to said signal IPREB (47), the recording information generator 1 supplies the signal IPRNST (32) to the recorder 3 for starting the sheet feeding and the copying sequence. In response to said a signal IPRNST (32), the recorder 3 starts the copy sequence, resets the signal IPREB (47) and drives the paper feed roller 7 for sheet feeding (steps 107, 108).

In the present embodiment, the rollers in the sheet transporting system shown in FIG. 2 are mutually synchronized, and the absolute position of the recording sheet is determined by the aforementioned drum clock signal 42. The signal IPREB (47) is automatically set at a determined time after a sheet is extracted from the cassette. The CPU 40 supplies the signal ITOP (46) to the recording information generator 1 when the front end of the recording sheet reaches a position 16 (FIG. 2) corresponding to the timing of starting the laser recording operation.

Said timing position 16 has two cases and is dependent on the recording unit to be employed. In relation to a laser beam exposure position 17 (laser recording position) and a point for starting the transfer to the recording sheet 18 (position of contact between the drum and the front end of the recording sheet) shown in FIG. 2, there can be considered the following two cases:

case A: the distance between the positions 17 and 18 is equal to or shorter than the distance between the center of the regist. roller 6 and the position 18 (distance between 17 and 18 $\leq$ distance between the center 16 of the regist. roller 16 and 18); and case B: the distance between the positions 17 and 18 is longer than the distance between the center of the regist. roller 6 and the position 18 (distance between 17 and 18 = distance between the center of the regist. roller 6 and 18 + distance between the center of the regist. roller 6 and 16). Consequently the read-only memory of the CPU should contain a program for either case A or case B according to the recording apparatus. Also in case of a recording apparatus including plural transporting paths for the recording sheets, a selector switch may be provided to select the case A or B according to the transporting path, and such selection may be conducted either manually or automatically.

In response to the signal ITOP (46), the recording information generator 1 releases the content of an internal recording information memory (page memory) as the signal VIDEO1 (36), and the recorder 3 supplies said signal VIDEO1 (36) to the semiconductor laser 20 to effect the image recording (steps 118, 119 in case A, or steps 110, 111 in case B). After the start of supply of said signal VIDEO1 (36), it is synchronized in the horizontal direction by the aforementioned signal BD for driving the semiconductor laser. In the operation in the case A, the CPU counts the drum clock signal 42, prior to the release of the signal ITOP (46), to form a sufficient curl in the sheet, then stops the paper feed roller 7 through the driver 43 and simultaneously drives the regist. roller 6 (steps 116, 117), and releases the signal ITOP after counting a determined number of the drum clock signals (step 118).

In said case A wherein the distance between the positions 17 and 18 is shorter than the distance between the center of the regist. roller 6 and the position 18, the front end of the sheet is registered with the front end of the image on the drum by the release of the signal ITOP after the sheet is transported by a determined distance toward the drum by the regist. roller 6 in the steps 117 and 118.

In the operation of the case B, the signal ITOP is released in the step 111 when the sheet is transported to a determined position by counting a determined number of the drum clocks in the step 110.

In this case the CPU 40 forms a sufficient curl in the sheet at a determined timing after the release of the signal ITOP (46), then stops the paper feed roller 7 through the driver 43 and simultaneously drives the regist. roller 6 (steps 112, 113). The signal ITOP is released at a timing in consideration of the sheet curl. After the start of image recording in this manner, the CPU 40 calculates the image recording time for a page from a sheet size signal 55, and, upon expiration of said image recording time, releases the signal IPREND (50) indicating the end of the image area through a driver 45 (steps 114, 115, 120). In the ITOP synchronization mode, the entire recording information can be exactly transmitted in response to the signal ITOP to be released from the recording unit, since the recording information of a page is stored in the recording information generator prior to the start of image recording. The image recording time is measured by counting the drum clcok signal 42 in an interruption process (step 121).

Figure 8:
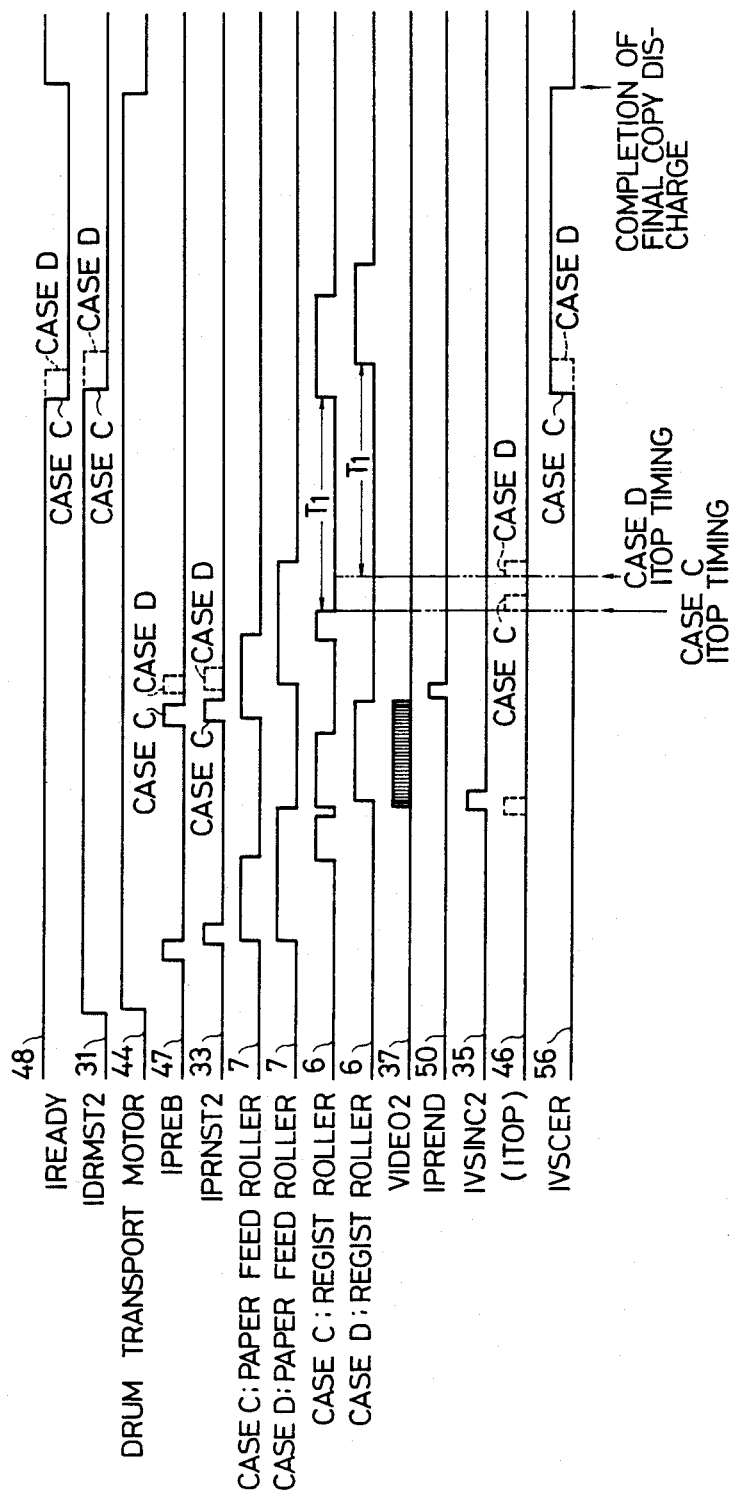
FIG. 8 is a timing chart in an IVSINC synchronization mode.

In the following there will be given an explanation on the function in the IVSINC synchronization mode, while making reference to the timing chart and the control flow chart respectively shown in FIGS. 8 and 10. The recording information generator usable in the IVSINC synchronization mode is represented for example by an original document reader or the like, which is provided with a buffer memory corresponding to several lines.

If the recorder 3 has no abnormality therein and the recording operation is ready to start, the program proceeds from a step 130 to a step 131 for generating the signal IREADY (48) thus advising the availability to the recording information generator. When the recording information generator 2 is to start the recording, the signal IDRMST2 (31) is supplied to the recorder 3 to start the recording operation. In this case the recording information generator need not have a memory corresponding to a page as in the ITOP synchronization mode, but a buffer memory corresponding to several lines may be employed to transmit the image information to the recorder 3 while storing new information before it is emptied. For example, if the transmission speed of the image information to the recorder 3 is made identical with the image scanning speed, plural line buffer memories may be used in cyclic manner that information is supplied to the photosensitive member from a memory while new recording information is stored in another memory. The function of the recorder 3 in response to the signal IDRMST2 (31) is the same as that in response to the signal IDRMST1 (30) (steps 104, 105 and 106 respectively corresponding to steps 134, 135 and 136). In response to the entry of the signal IDRMST2 (31) in the step 133, the recorder 3 drives the drum transport motor 44 in the step 134. Then, when all the conditions for recording are satisfied in the step 135, the program proceeds to the step 136 to release the signal IPREB (47) for enabling the start of recording.

In response to said signal IPREB (47), the recording information generator 2 supplies the signal IPRNST 2 (33) to the recorder 3 in the same condition as the signal IPRNST1 (32) in the aforementioned step 107. Upon receipt of the signal IPRNST2 (33) in a step 137, the recorder 3 starts the copying sequence, resets the signal IPREB (47) and drives the paper feed roller (step 138).

In the aforementioned ITOP synchronization mode, the image information is transmitted in response to the information requesting signal ITOP (46) supplied from the recorder 3 to the recording information generator 1. On the other hand, in the IVSINC synchronization mode, the transmission of the image information is effected after the entry of the signal IVSINC2 (35) indicating the start of output of image signals from the recording information generator, so that the recorder 3 adjusts the recording position on the recording sheet by means of the regist. roller 6. The recording information generator 2 is required to release the signal IVSINC2 (35) at a timing equal to or later than the output timing of the signal ITOP in the aforementioned ITOP synchronization mode. The entire visible image on the photosensitive drum 10 may not be transferred onto the recording sheet in case the image information is transmitted before said timing of the signal ITOP. In order to prevent such phenomenon there may employed a method of releasing, after a determined time from the output of the signal IPRNST (33) from the recording information generator 2, the signal IVSINC2 (35) and subsequently the signal VIDEO2 (37), or a method of releasing the aforementioned signal ITOP (46) from the recorder 3 (corresponding to the aforementioned steps 111, 119) thereby advising the recording information generator 2 that the recording sheet has reached the position 16 corresponding to the start timing of the laser recording. The recording information generator 2 thus releases the signal IVSINC2 (35) and the image information VIDEO (37) at an arbitrary timing within a determined period from the entry of said signal ITOP (46). In the IVSINC synchronization mode, the control cannot be the same as in the ITOP synchronization mode, since the timing of transmission of the recording information varies depending for example on the image reading timing of the reader unit.

In the same manner as in the ITOP synchronization mode, there exist two cases C and D as will be explained in the following. The aforementioned selector switch for the cases A and B may also be used for selecting the cases C and D.

In the case C, in which the distance between the positions 17 and 18 is equal to or shorter than the distance between the center of the regist. roller 6 and the position 18, the control procedure the same as that in the ITOP synchronization mode (steps 116, 117 and 118 respectively corresponding to steps 155, 156 and 157) until the recording sheet reaches the ITOP position (step 157A). When the recording sheet arrives at said ITOP position, the regist. roller is stopped and the recording unit awaits the signal IVSINC2 (35) from the recording information generator 2 (step 158). At the same time a timer A is also started (step 159). Upon entry of the signal IVSINC2 (35) (step 160), the regist roller 6 is driven (step 161) and the recording information generator releases the image information VIDEO2 for recording. The recorder 3 activates the timer A when the recording sheet reaches the ITOP position for inspecting the failed entry of the signal IVSINC2 (35) resulting from a failure in the recording information generator 2. This procedure is conducted to prevent the jamming of the recording sheet in the recorder 3. In case the timer A reaches a value T1 due to the absence of entry of the signal IVSINC2 (35) for a determined period (step 164), the regist. roller 6 is activated to discharge the unused recording sheet to a try 13 according to a sheet discharging procedure. Simultaneously the CPU 40 turns off the signal IREADY (48) and turns of the signal IVSCER (56) indicating the failed entry of the signal IVSINC2 (35), thus advising the recording information generator of the presence of an abnormality (step 165). When the unused recording sheet passes a discharge sensor 19 (step 166), the drum transport motor 44 and the signal IVSCER (56) are turned off (step 167) and the program returns to the start.

In the case D, in which the distance between the positions 17 and 18 is longer than that between the center of the regist. roller 6 and the position 18 as in the case B, a determined number of drum clocks are counted (step 140) and timers A, B are started when the recording sheet reaches a determined position (step 141).

The signal ITOP is generated at a timing when the front end of the recording sheet reaches a determined position between the regist. roller 6 and the paper feed roller 7, and the CPU 40 measures, by means of the timer B, a time T2 from the generation of the signal ITOP (step 140A) to the entry of the signal IVSINC2 (35) (step 142) in a step 143. If the signal IVSINC2 (35) is not received until the timing of stopping the paper feed roller (step 152), said roller 7 is stopped (step 153) and the counting operation of the timer B is terminated (step 154), since the recording sheet no longer moves thereafter. In case the signal IVSINC2 (35) is entered in the step 142, the counting operation of the timer B is stopped in a step 143 but the recording sheet continues to be transported until the roller is stopped (steps 144, 145). The timer A is reset in the step 143. In case the program proceeds through the steps 152 and 153, no actual operations are conducted in the steps 144 and 145. Since the recording sheet is already transported, when the feed roller stops, by the period T2 counted by the timer B from the position 16 corresponding to the timing of laser recording, the regist. roller 6 is activated (step 148) after the lapse of said period T2 (step 146) for registering the front end of the recording sheet with the start position for laser recording on the photosensitive drum. In case the signal IVSINC2 (35) is not received in the steps 142, 151 during the period T1 counted by the timer A, the program proceeds to steps 165–167 for executing a procedure similar to that in the case C, and the program thereafter returns to the start.

The counting of the drum clock signal 42 and the timer counting are conducted by an interruption procedure (steps 168, 169). The timers utilize interruptions at a regular interval, for example real time clock pulses. The steps 162, 163 in the case C correspond to the steps 120, 115 in the aforementioned case A, and the steps 149, 150 in the case D correspond to the steps 114, 115 in the aforementioned case B.

Figure 1:
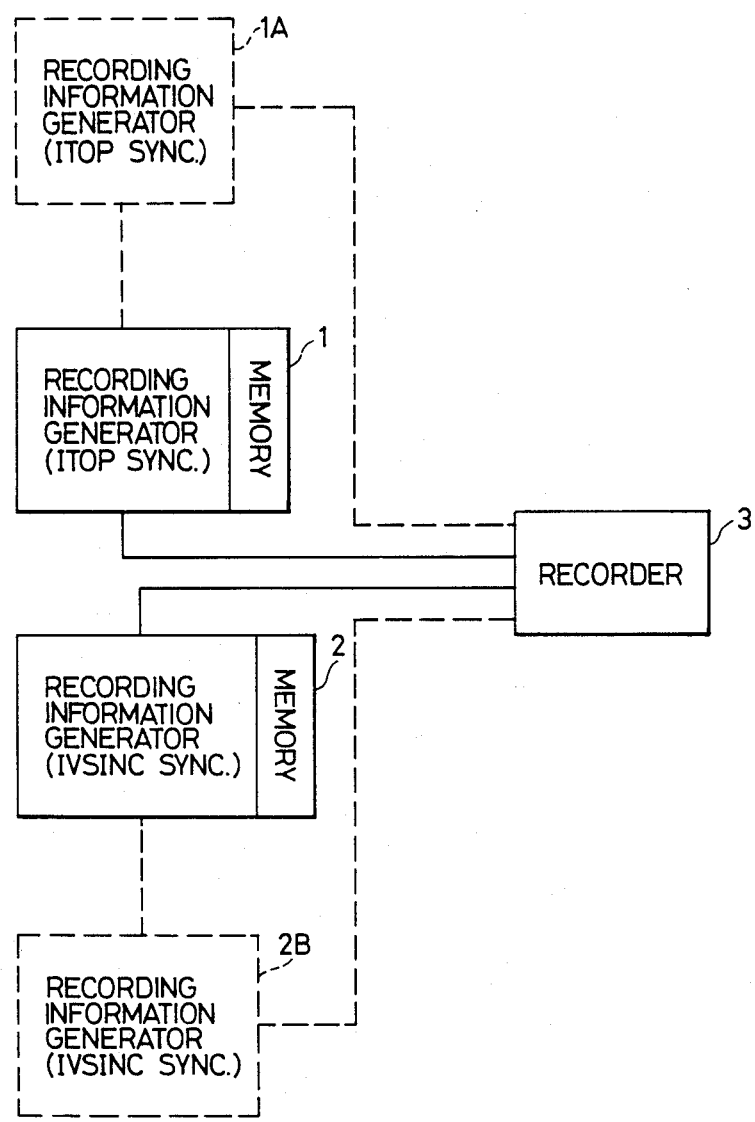
FIG. 1 is a block diagram showing the connection of a recording unit with plural recording information generating units.

In FIGS. 4, 5 and 6 there is employed a 2-input 1-output selector 38, but the connection to plural recording information generators is rendered possible by employing multi-input selector through the use of a selector switch having several contacts or of several input lines for the signal MODIN (61). FIG. 1 shows an example of connection of plural recording information generators with the recording unit 3, wherein the recording information generators 1, 1A are of the ITOP synchronization mode while the generators 2, 2B are of the IVSINC synchronization mode.

The recording of the present invention is not limited to paper but is also applicable to any other material as long as it is of a form and has properties allowing the recording.

The above-described structure enables improvement of the recording efficiency and employment of a single recording unit for recording information generators of different types, by employing a page printing process capable of high-speed recording in case the recording information generator stores recording information equal to or in excess of one page, or a line printing process in case the recording information is less than one page but is entered in succession.

Also the present invention allows reduction of the time of recording materials are in the recording apparatus other than by jamming, thus facilitating the posterior handling by the operator and enabling rapid recovery of the normal function.

Also the apparatus of the present invention is capable of avoiding the presence of the recording sheet for example in case of an erred operation of the recording unit for example due to noise. Besides, in case a sorter is connected to the recording apparatus, the signal IVSCER may be utilized for sorting.

Now there will be given an explanation on a recording apparatus, which, in case a recording sheet remains in the recorder 3, is capable of utilizing such recording sheet. The following description will be limited to the function in the IVSINC synchronization mode, since the structure of the recording apparatus and the function timing and control flow in the ITOP synchronization mode are same as already explained.

Figure 11:
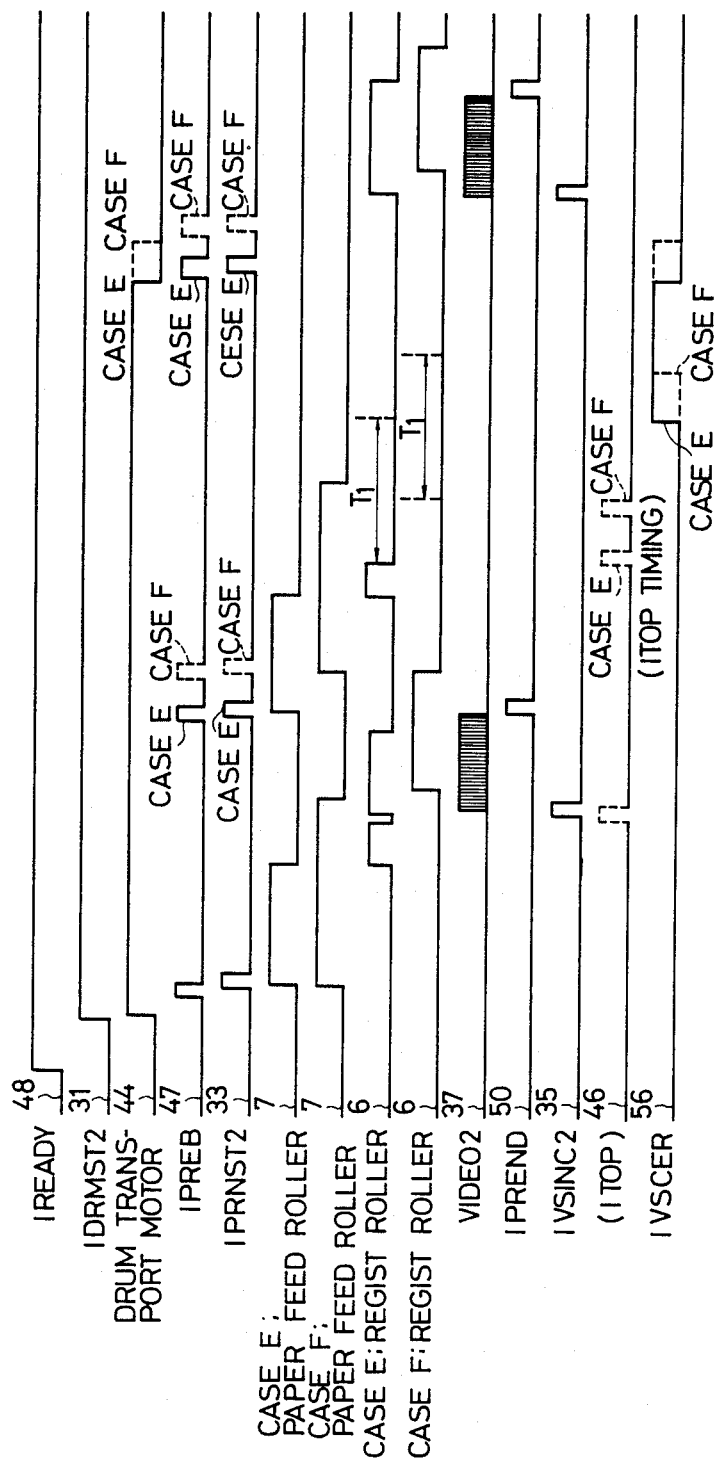
FIG. 11 is a timing chart in the IVSINC synchronization mode in another embodiment.
Figure 12:
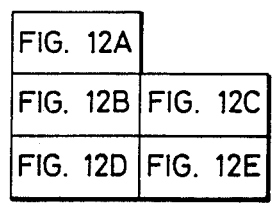
FIG. 12 composed of FIG. 12A to 12E is a flow chart in the IVSINC synchronization mode in said another embodiment.
Figure 12A:
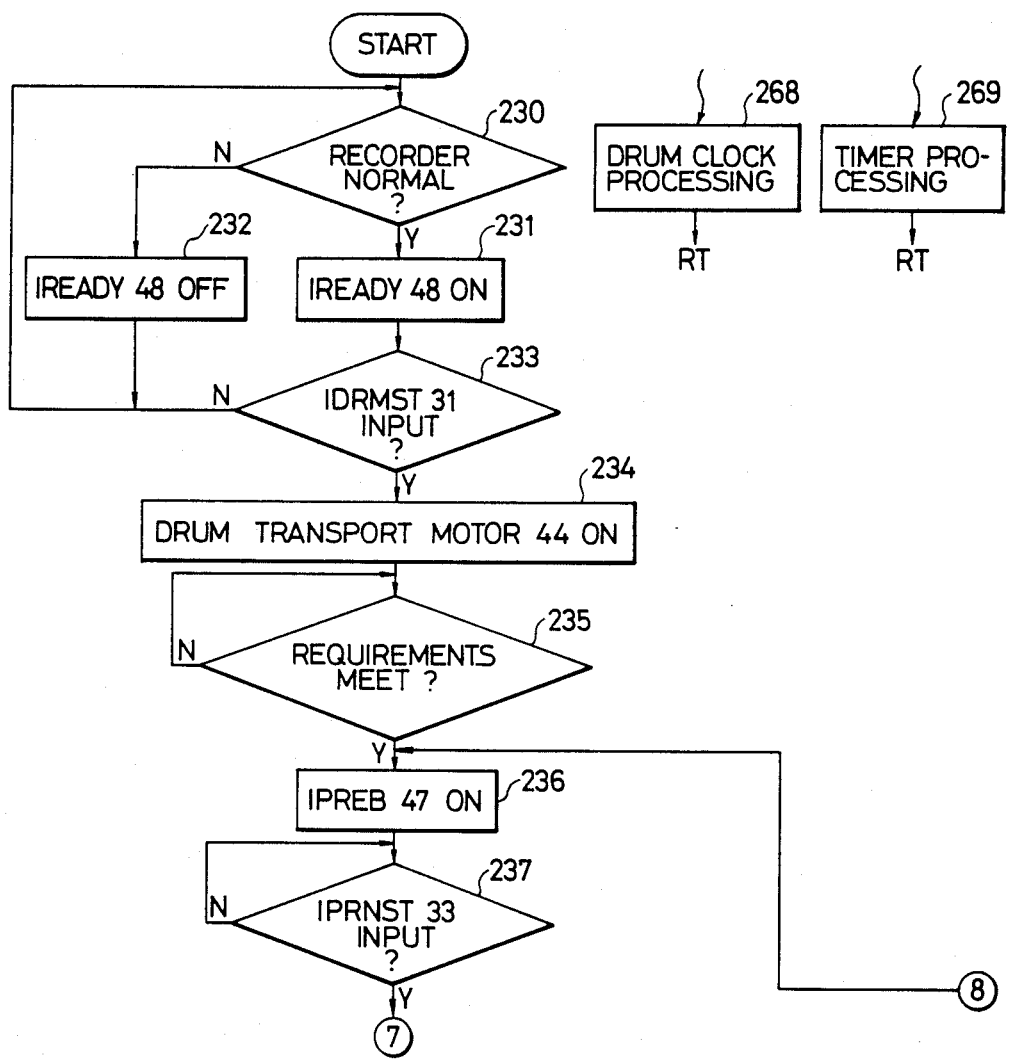
Figure 12B:
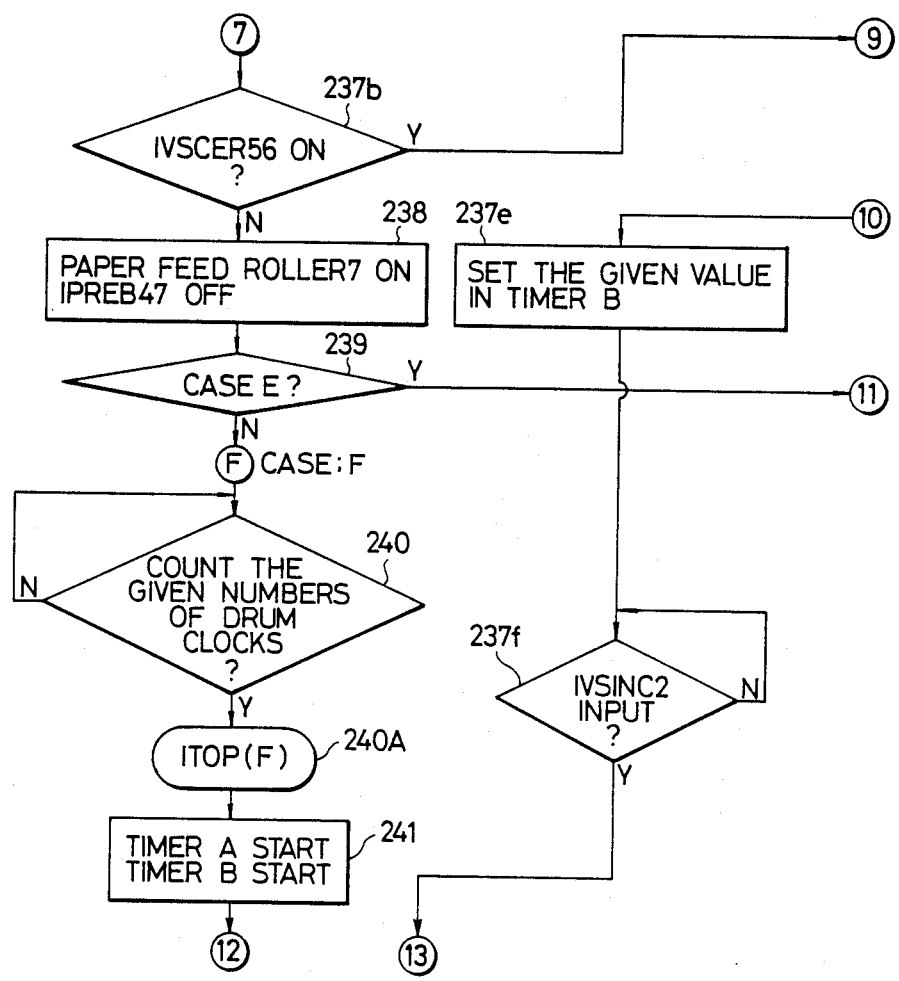
Figure 12C:
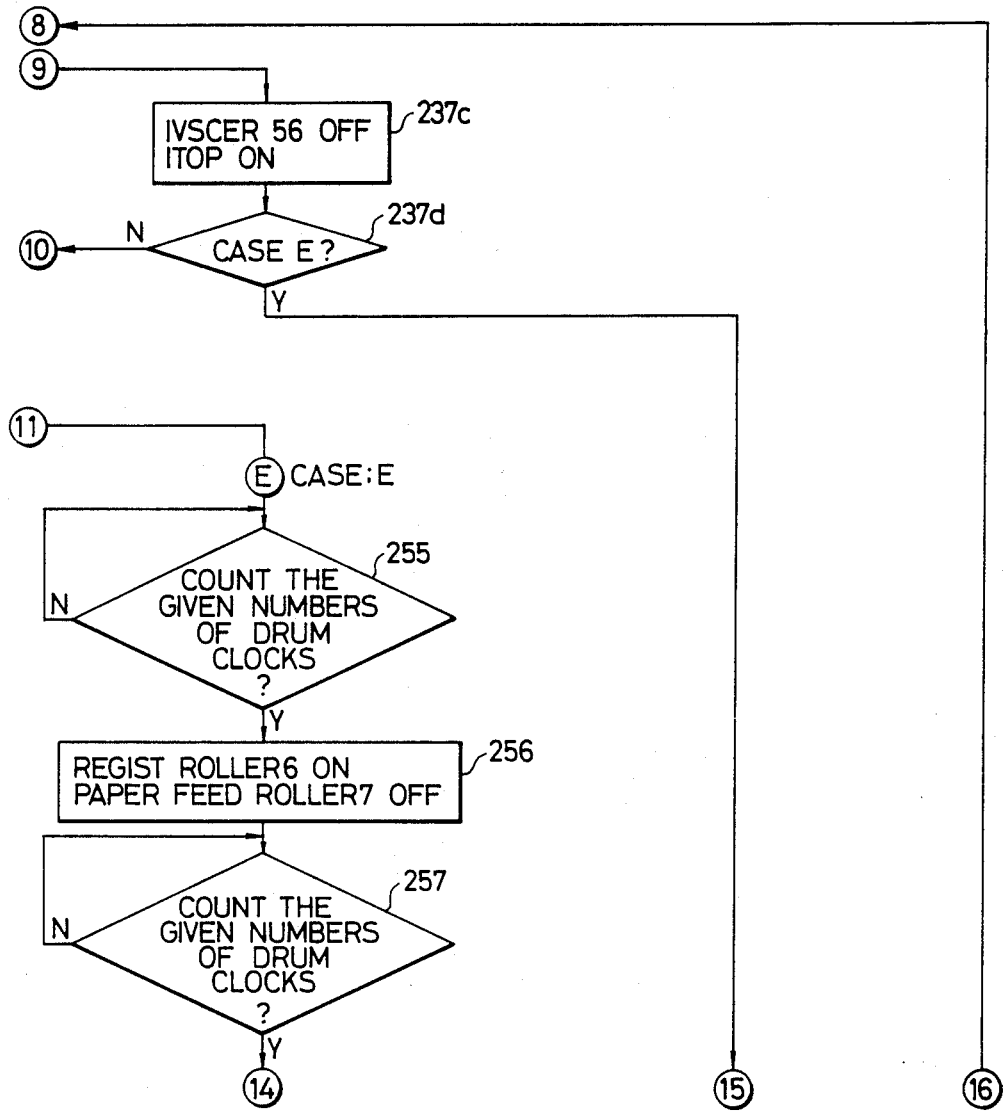
Figure 12D:
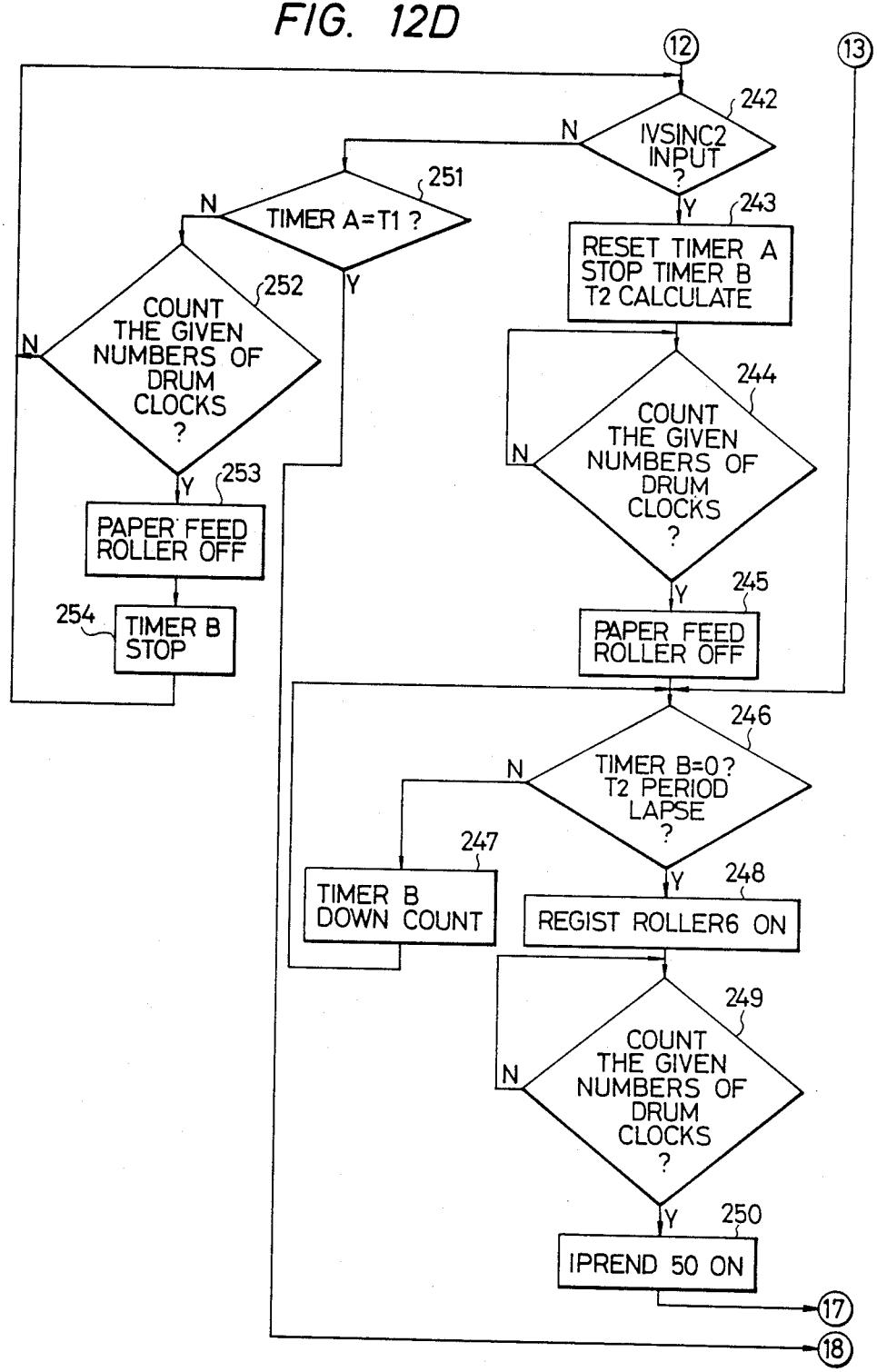
Figure 12E:
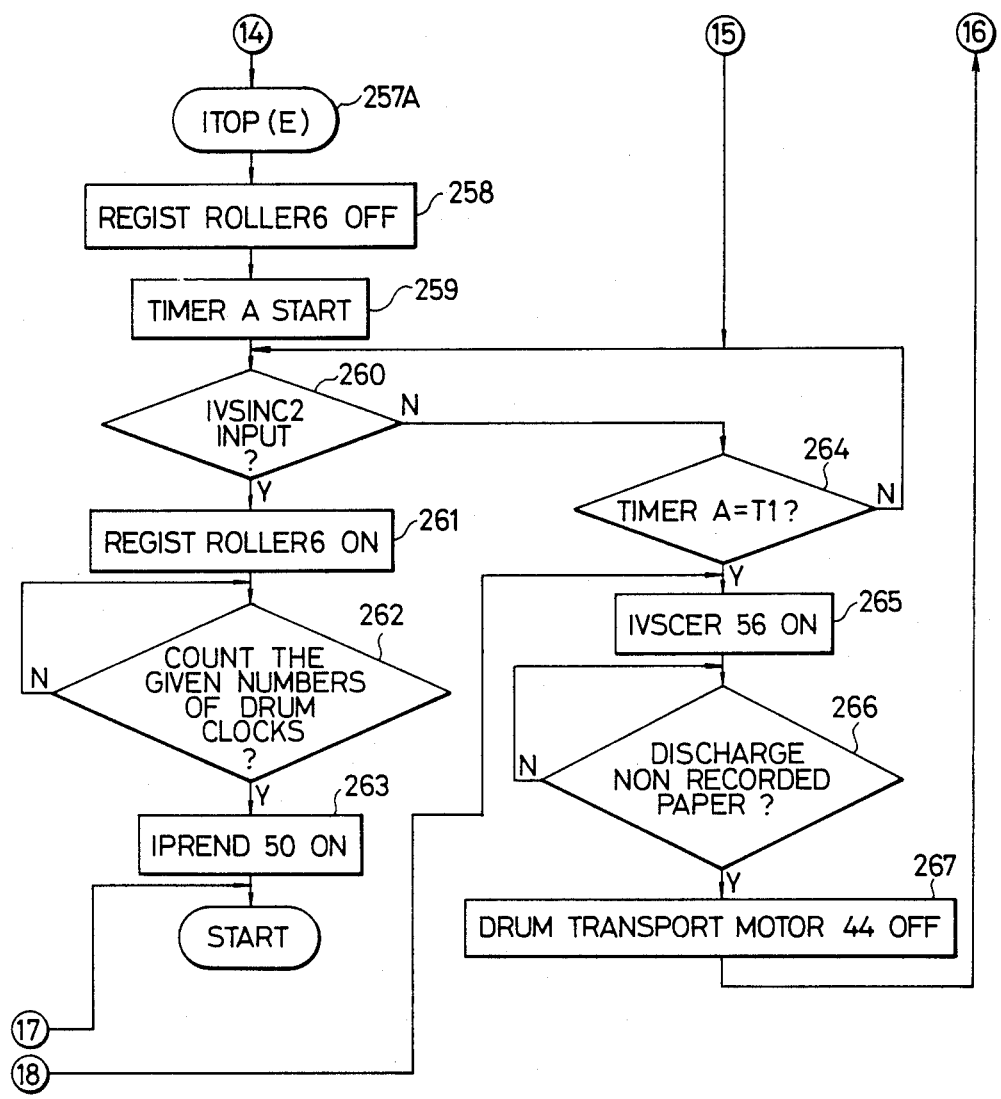

Reference is now made to the function timing and control flow chart respectively shown in FIGS. 11 and 12 representing the function in the IVSINC synchronization mode, wherein cases E and F explained later respectively correspond to the cases A and B explained before.

Figure 10B:
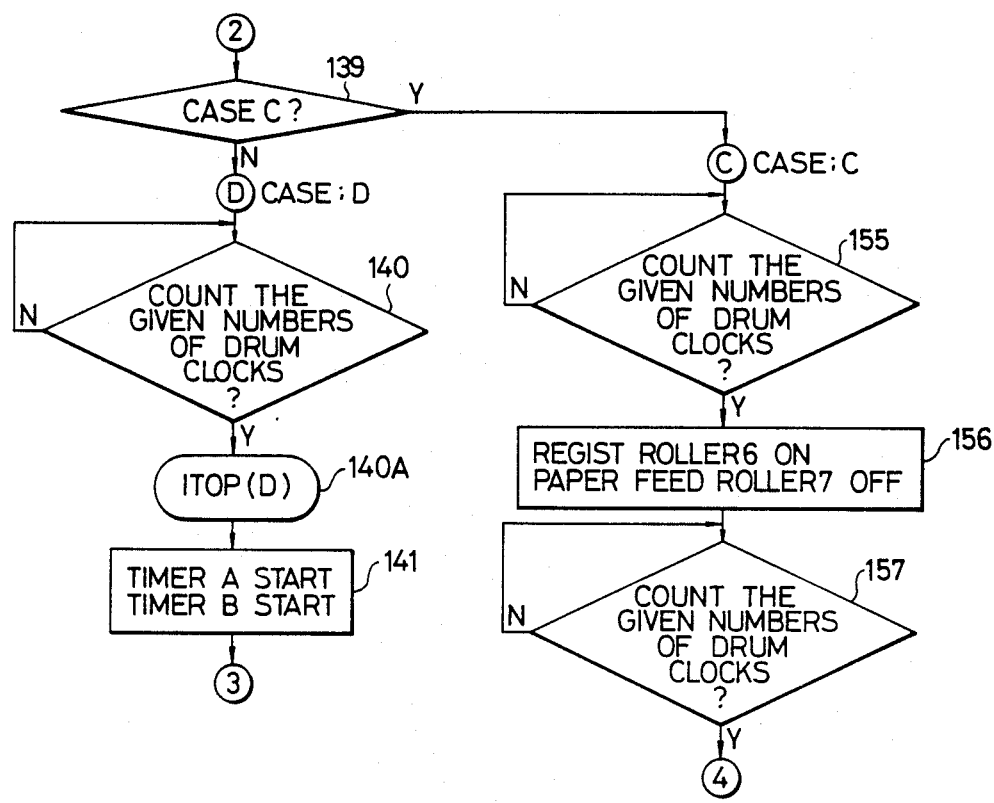
FIG. 10 composed of FIG. 10A to 10D is a flow chart in the IVSINC synchronization mode.
Figure 10C:
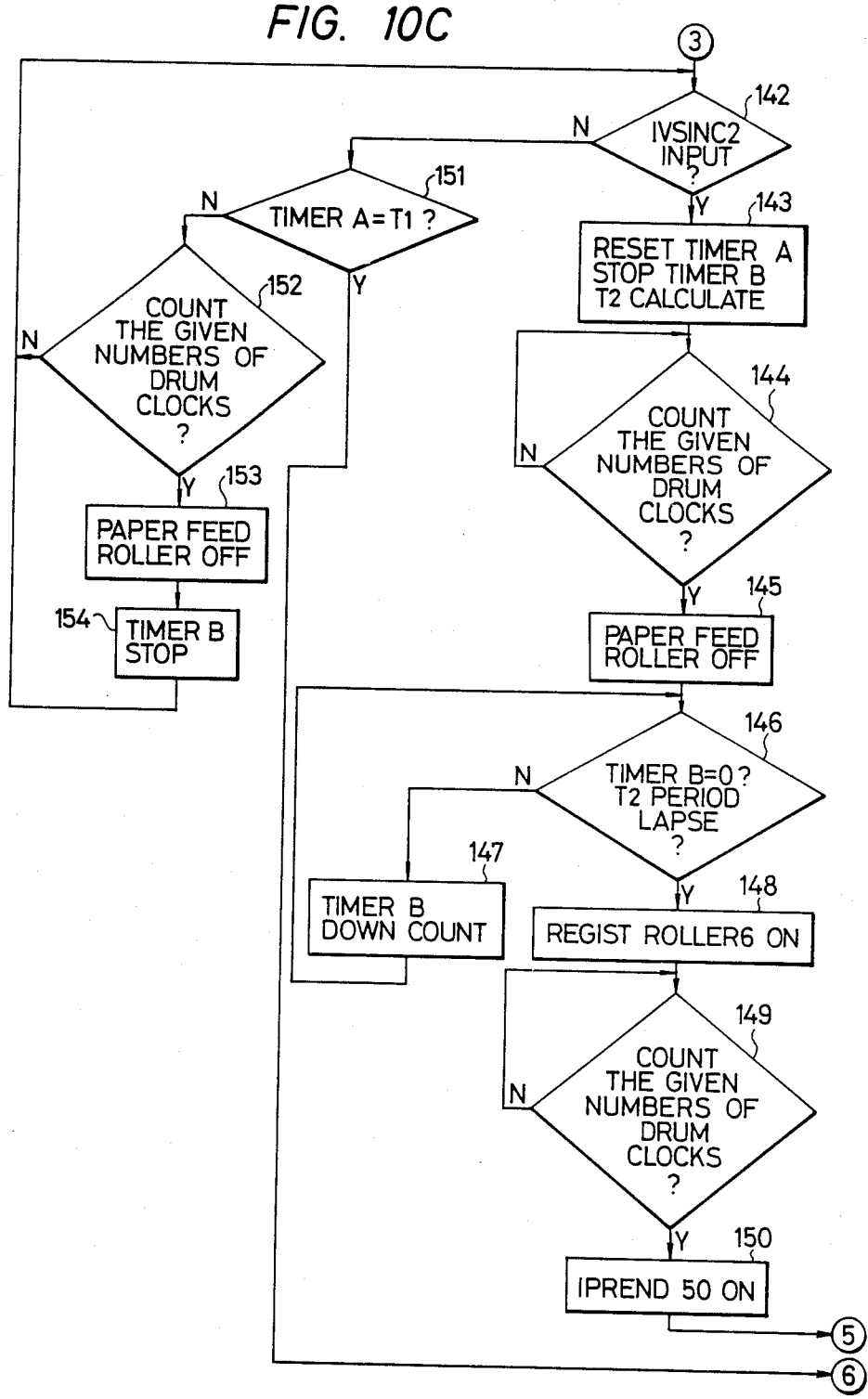
Figure 10D:
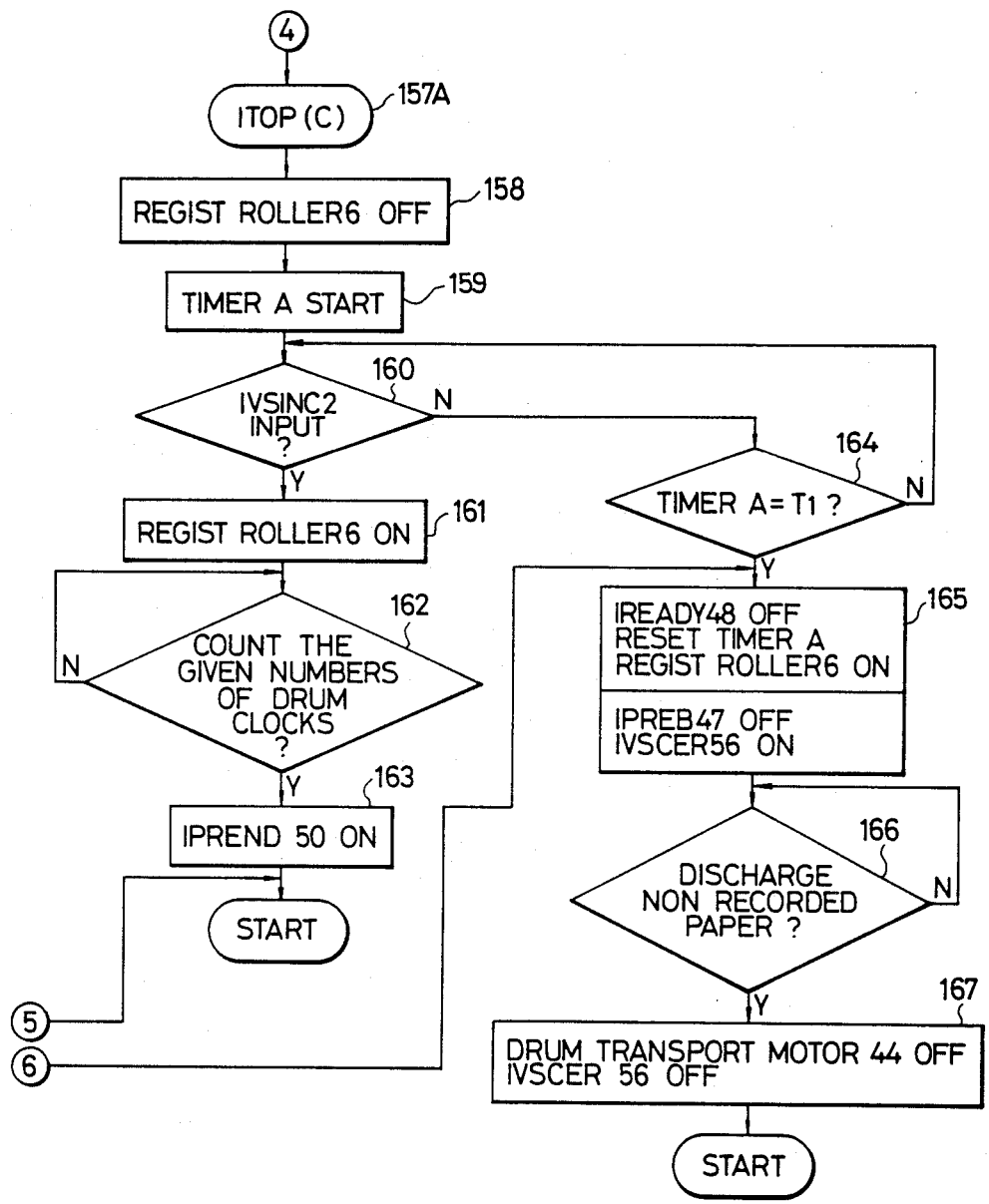

Explanation on steps 230 to 237 will be omitted as they are the same as the steps 130 to 137 explained already in relation to FIG. 10. Upon reception of the signal IPRNST (33) in a step 237, the recorder 3 identifies whether a recording sheet has been supplied to the recording apparatus (step 237b), and, if not, activates the feed roller 7 to start the sheet feeding and turns off the signal IPREB (47) (step 238). In case the signal IVSCER (56) is present at the reception of the IPRNST2 (33), indicating the presence of a recording sheet in the recording apparatus, the program proceeds to a step 237c for turning off the signal IVSCER (56) and releasing the signal ITOP. In the case E, wherein the sheet stays at the ITOP position, the programs proceeds to a step 260 for awaiting the entry of the signal IVSINC2 (35). In the case F wherein the front end of the sheet has passed the ITOP position and is stopped at the regist. roller 6, the timer B is set to a determined value at a step 237e, and, in response to the entry of the signal IVSINC at a step 237f, the program proceeds to a step 246. Sequences after the step 260 or 246 will be explained later. If the signals IPRNST2 (33) and IVSCER (56) are both present, indicating that the sheet has passed the ITOP position, the signal IVSINC2 (35) is immediately released and the signal VIDEO2 (37) is released also both in the cases E and F. In the aforementioned ITOP synchronization mode, the image information is transmitted in response to the transmission requesting signal ITOP (46) supplied from the recorder 3 to the recording information generator 1. In the IVSINC synchronization mode, however, the image information is transmitted after the signal IVSINC2 (35) indicating the start of transmission of the image information from the recording information generator. Consequently the recorder 3 adjusts the recording position on the recording sheet by means of the regist. roller 6. The recording information generator 2 is required to generate the signal IVSINC2 (35) at a timing equal to or subsequent to the output timing of the signal ITOP in said ITOP synchronization mode. The entire visible image on the photosensitive drum 10 may not be transferred onto the recording sheet in case the image information is transmitted prior to said output timing of the signal ITOP. In order to prevent such phenomenon, there may be employed a method of releasing, after the lapse of a determined period from the release of the signal IPRNST (33) from the recording information generator 2, the signal IVSINC2 (35) and subsequently the image information VIDEO2 (37), or a method of releasing said signal ITOP (46) from the recorder 3 (corresponding to the aforementioned steps 111, 119) to advise the recording information generator 2 that the recording sheet has reached the position 16 corresponding to the start of laser recording. The recording information generator 2 releases the signal IVSINC2 (35) and the image information VIDEO2 (37) at an arbitrary timing within a determined period from the entry of said signal ITOP (46).

As in the aforementioned ITOP synchronization mode, there can be considered two cases E and F as will be explained in the following.

In the case E, in which the distance between the positions 17 and 18 is equal to or shorter than the distance between the center of the regist. roller 6 and the position 18 as in the aforementioned case A, the control procedure is same as that in said case A in the ITOP synchronization mode until the recording sheet reaches the ITOP position (steps 116, 117 and 118 respectively corresponding to steps 255, 256 and 257). When the recording sheet reaches said ITOP position, the regist. roller 6 is stopped and the recording unit awaits the entry of the signal IVSINC2 (35) from the recording information generator 2 (step 258). At the same time the timer A is started (step 259). In response to the entry of the signal IVSINC2 (35) (step 260), the regist. roller 6 is activated (step 261) and the recording information generator releases the image information VIDEO2 (37) for effecting the recording. The recorder 3 activates the timer A from the arrival at the ITOP position, thus inspecting a failed entry of the signal IVSINC2 (35) due for example to a failure in the recoridng information generator 2. In case the timer A reaches a determined time T1 without the entry of the signal IVSINC2 (35) (step 264), the CPU 40 turns on the signal IVSCER (56) to advise the recording information generator 2 of the presence of an abnormality (step 265). In the present embodiment, however, an unused remaining sheet is made available for recording. Therefore, after the discharge of other sheets from the apparatus (step 266), the drum transport motor 44 is turned off (step 267) and the program proceeds to a step 236 for enabling the recording in response to the signal IPRNST (33).

In the case F in which the distance between the positions 17 and 18 is longer than the distance between the center of the regist. roller 6 and the position 18, the drum clock signals 42 of a determined number are counted in a step 240, and the timers A, B are activated when the recording sheet reached a determined position (step 241).

The CPU 40 measures, by the timer B, the period T2 from the timing of the signal ITOP (step 240A) to the entry of the signal IVSINC2 (35) (step 242) since the signal ITOP is generated when the front end of the recording sheet reaches a determined position between the regist. roller 6 and the sheet feed roller 7 (step 243). If the signal IVSINC2 (35) is not received until the feed roller is stopped (step 252), said feed roller is stopped (step 253) and the counting operation of the timer B is terminated (step 254), since the recording sheet no longer moves thereafter. In response to the entry of the signal IVSINC2 (35) in a step 242, the counting operation of the timer B is terminated at a step 243 but the recording sheet continues to be transported until the timing of stopping the paper feed roller (steps 244, 245). The timer A is reset at the step 243. In case the program proceeds through the steps 252 and 253, no actual operations are conducted in the steps 244 and 245. Since the recording sheet is already transported, when the feed roller stops, by a period T2 measured by the timer B from said position 16, after the lapse of said period T2 (step 246), the regist. roller 6 is activated (step 248) to register the front end of the recording sheet with the start position of laser recording on the photosensitive drum. In the absence of the entry of the signal IVSINC2 (35) within the period T1 in the steps 242, 251, the same procedure as in the foregoing case E is executed and the program returns to the start (steps 265, 266, 267).

The counting of the drum clock signal 42 and the timer counting are effected by interruption procedures (steps 268, 269). The timers utilize interruptions of a determined interval, for example real-time clock signals. The steps 262 and 263 in the case E corresponding to the steps 120, 115 in the aforementioned case A, and the steps 249, 250 in the case F corresponding to the steps 114, 115 in the aforementioned case B.

The above-described structure avoids the disabled new recording resulting from the presence of a recording material in the absence of entry of a recording start signal from the recording information generator, thus reducing the operations of removing the recording materials by the operator and economizing the recording materials.

Also in the present embodiment in which the recording material, for example a recording sheet, is always supplied to a position enabling starting of the information recording, the time required for sheet supply is shortened corresponding to the distance from a start point of the recording material to the above-mentioned position.

Now there will be explained an embodiment which is provided with, instead of the above-described IVSINC synchronization mode, a VIDEO CLOCK synchronization mode utilizing video clock signals. The structure of the recording apparatus is essentially the same as those already explained in relation to FIGS. 2 and 3, and components of equivalent functions as in the foregoing embodiments are represented by same numbers or symbols.

Figure 13:
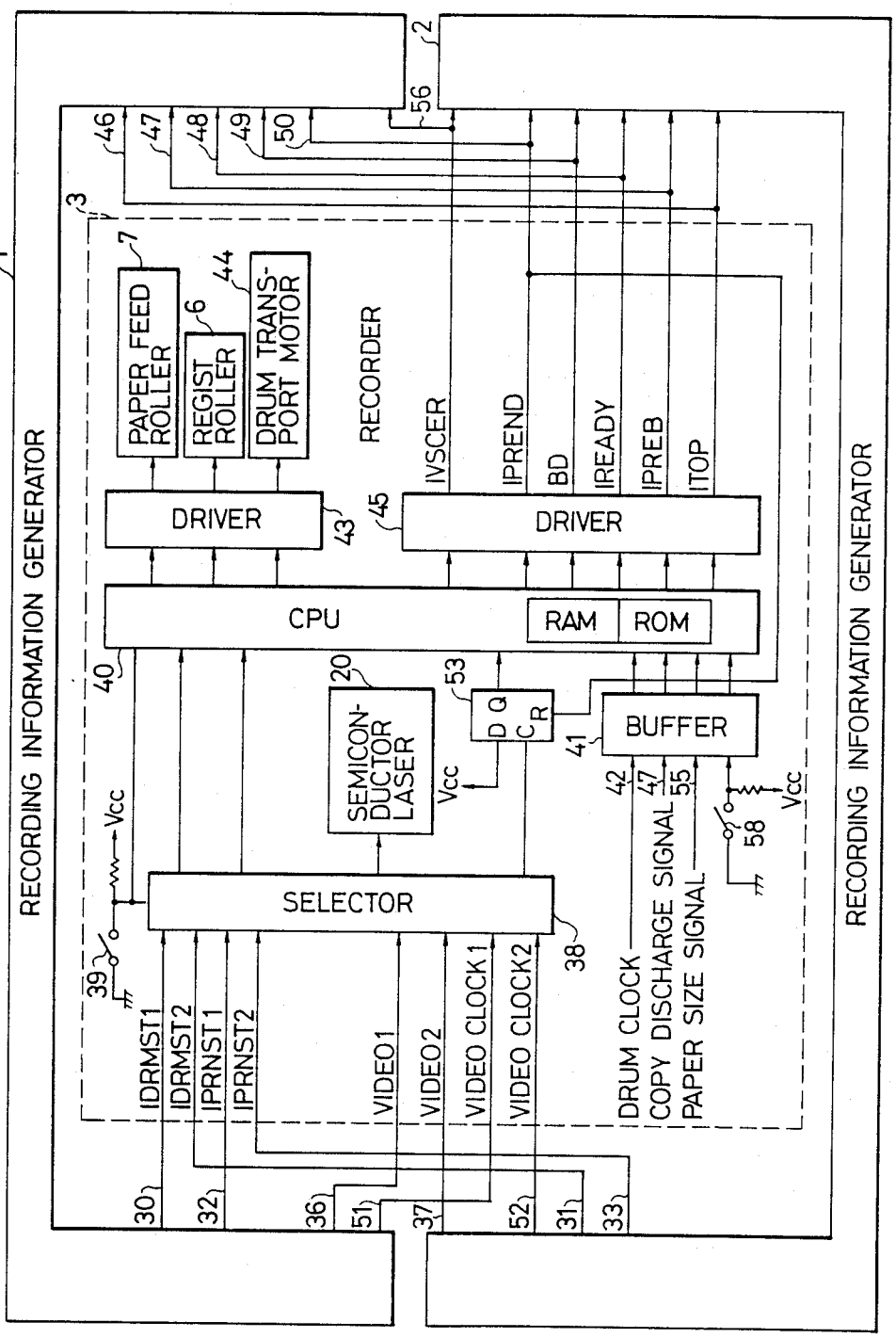
FIG. 13 is a block diagram of a recording apparatus having a VIDEO CLOCK synchronization mode, in which the recording information generator selecting means is incorporated in the recording unit.
Figure 14:
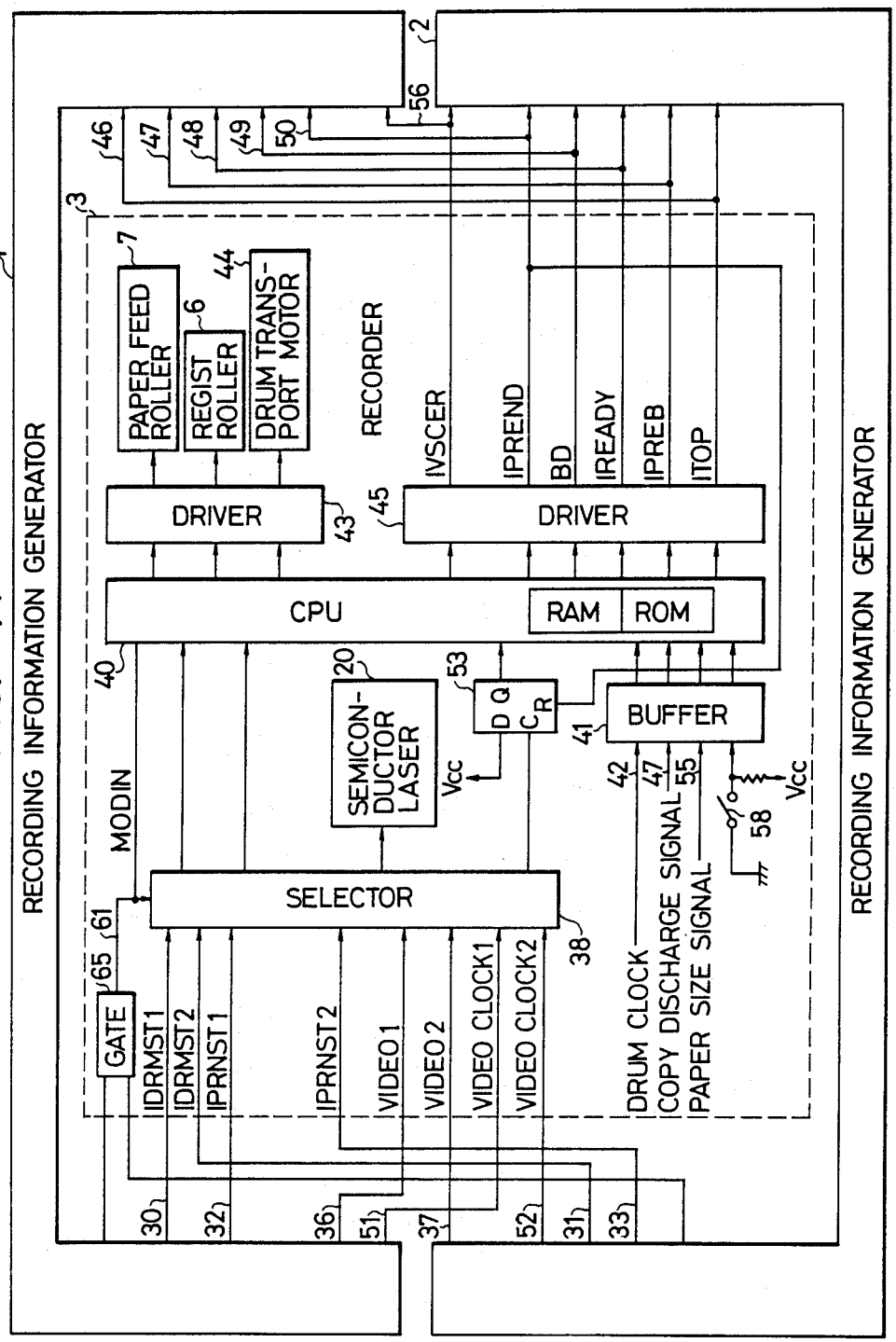
FIG. 14 is a block diagram of a recording apparatus having a VIDEO CLOCK synchronization mode, in which the recording information generator selecting means is incorporated in the recording information generators.
Figure 15:
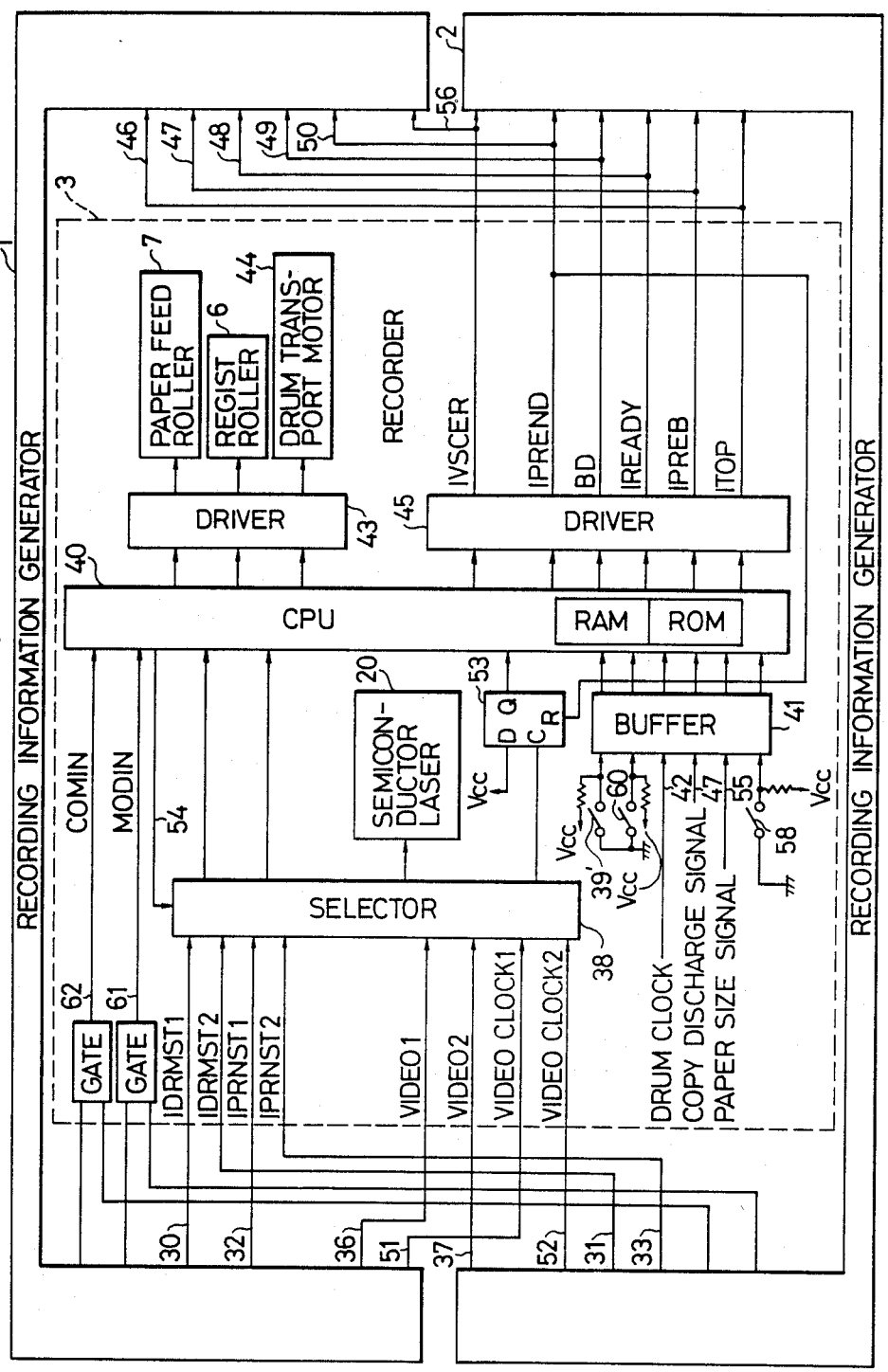
FIG. 15 is a block diagram of a recording apparatus having a VIDEO CLOCK synchronization mode, in which the recording information generator selecting means is incorporated in the recording unit and in the recording information generators with determined priority of selection.

FIG. 13 is a block diagram of a recording apparatus equipped with selecting means in the recorder 3, wherein a selector switch 39 in the recorder 3 causes, in the same manner as already explained in relation to FIG. 4, the selector 38 to release the signals selected from the signals 30–37, 51, 52 supplied from the recording information generators 1, 2. Said selector switch 39 also indicates to the CPU 40 whether the signal requesting the image recording is supplied from the recording unit 3 or from the recording information generator 1 (or 2). Stated differently, the selector switch 39 selects either the ITOP synchronization mode in which the request for image recording is made by the vertical synchronization signal ITOP supplied from the recorder 3, or another VIDEO CLOCK synchronization mode in which said request is achieved by the latching of video clock signals supplied from the recording information generator and functioning also as a signal requesting the start of image recording. FIG. 14 is a block diagram of a recording apparatus equipped with selecting means such as a selector switch in the recording information generator, wherein the signal MODIN (61) is supplied to the selector 38 and the CPU 40. In this case said signal MODIN (61) performs a function equivalent to that of the selector switch 39 in FIG. 13. FIG. 15 is a block diagram of a recording apparatus equipped with selecting means in the recording unit 3 and in the recording information generators 1, 2, wherein a signal COMIN (62) and a switch COMIN 60 are utilized for respectively enabling the signal MODIN (61) and the signal from the selector switch 39'. In case the signal COMIN (62) and the COMIN switch (60) are both in the enabled state, the CPU 40 receives a signal from a priority switch 58 and controls an input signal 54 to the selector 38 so as to enable signals to which the priority is given by said signal of the priority switch. In case either one of the signal COMIN (62) and the COMIN switch (60) is in the enabled state, the CPU 40 controls the input signal 54 to the selector 38 according to such enabling signal. In case both the signal COMIN (62) and the COMIN switch (60) are not in the enabling state, the CPU 40 controls the input signal 54 to the selector 38 so as to enable the signals of a priority mode previously determined, or the signals indicated by the priority switch 58. In the present block diagram the priority switch 58 is provided in the recorder 3, but a similar control procedure is realized even if said switch 58 is positioned in the recording information generator 1 or 2 and transmits a signal to the recorder 3. The output signals from the CPU 40, such as the signal VIDEO1 (36), signal VIDEO2 (37), drum clock signal 42, signal ITOP (46) will not be explained since they are same as those already explained in relation to FIG. 4.

Now there will be given an explanation on the control procedure in the VIDEO CLOCK synchronization mode, while making reference to the attached control flow charts and timing charts. In the following description reference is made to FIG. 13, since the control procedures shown in FIGS. 13 to 15 are essentially same. It is also assumed that the recording information generator 1 functions in the ITOP synchronization mode, while the recording information generator 2 functions in the VIDEO CLOCK synchronization mode.

The function timing and the control flow chart in the ITOP synchronization mode will not be explained in the following since they are same as already explained in relation to FIGS. 7 and 9.

Figure 16:
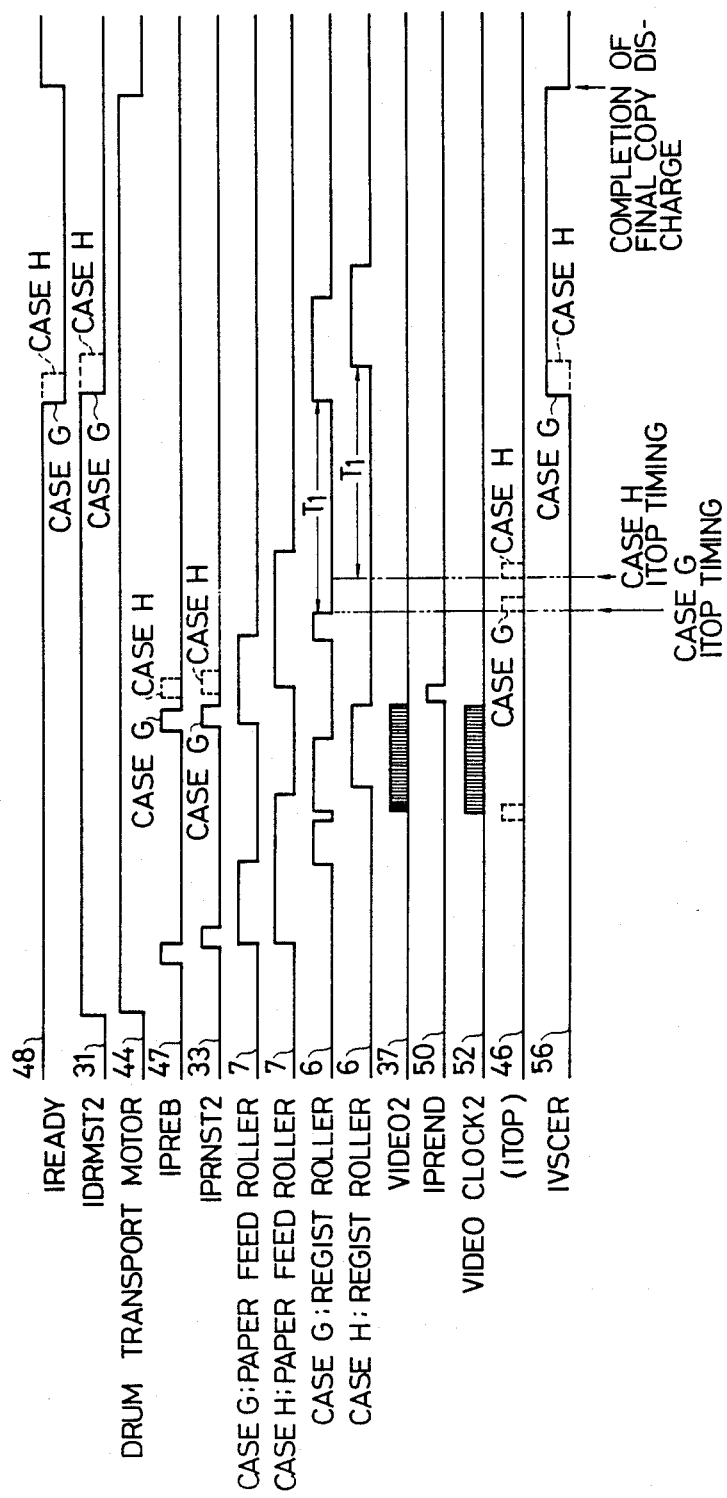
FIG. 16 is a timing chart in the VIDEO CLOCK synchronization mode.
Figure 17B:
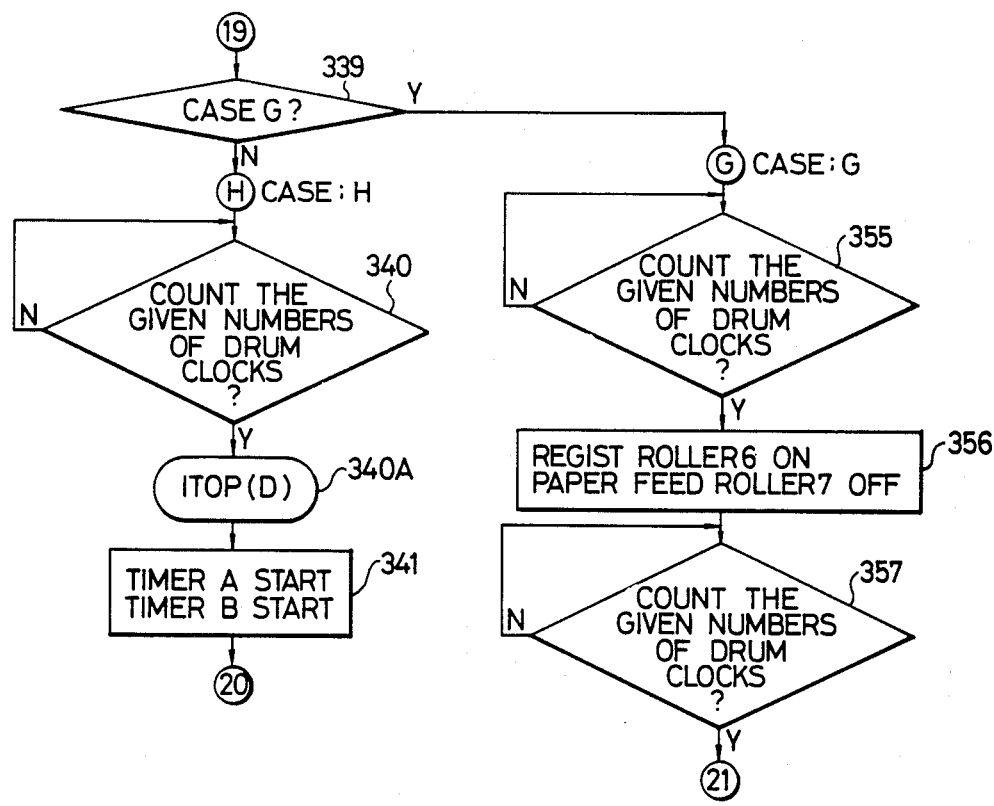
FIG. 17 composed of FIG. 17A to 17D is a flow chart in the VIDEO CLOCK synchronization mode.
Figure 17C:
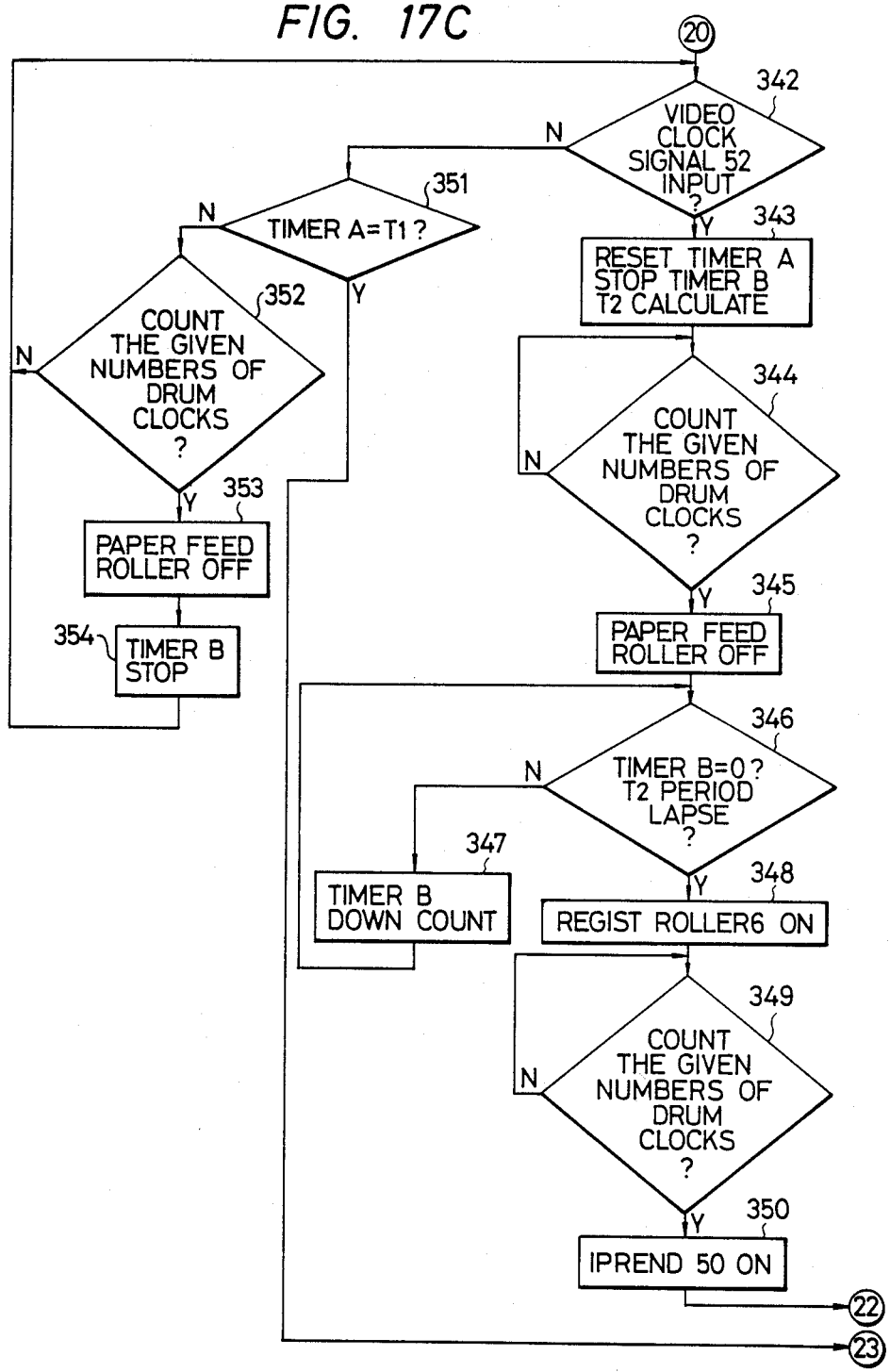
Figure 17D:
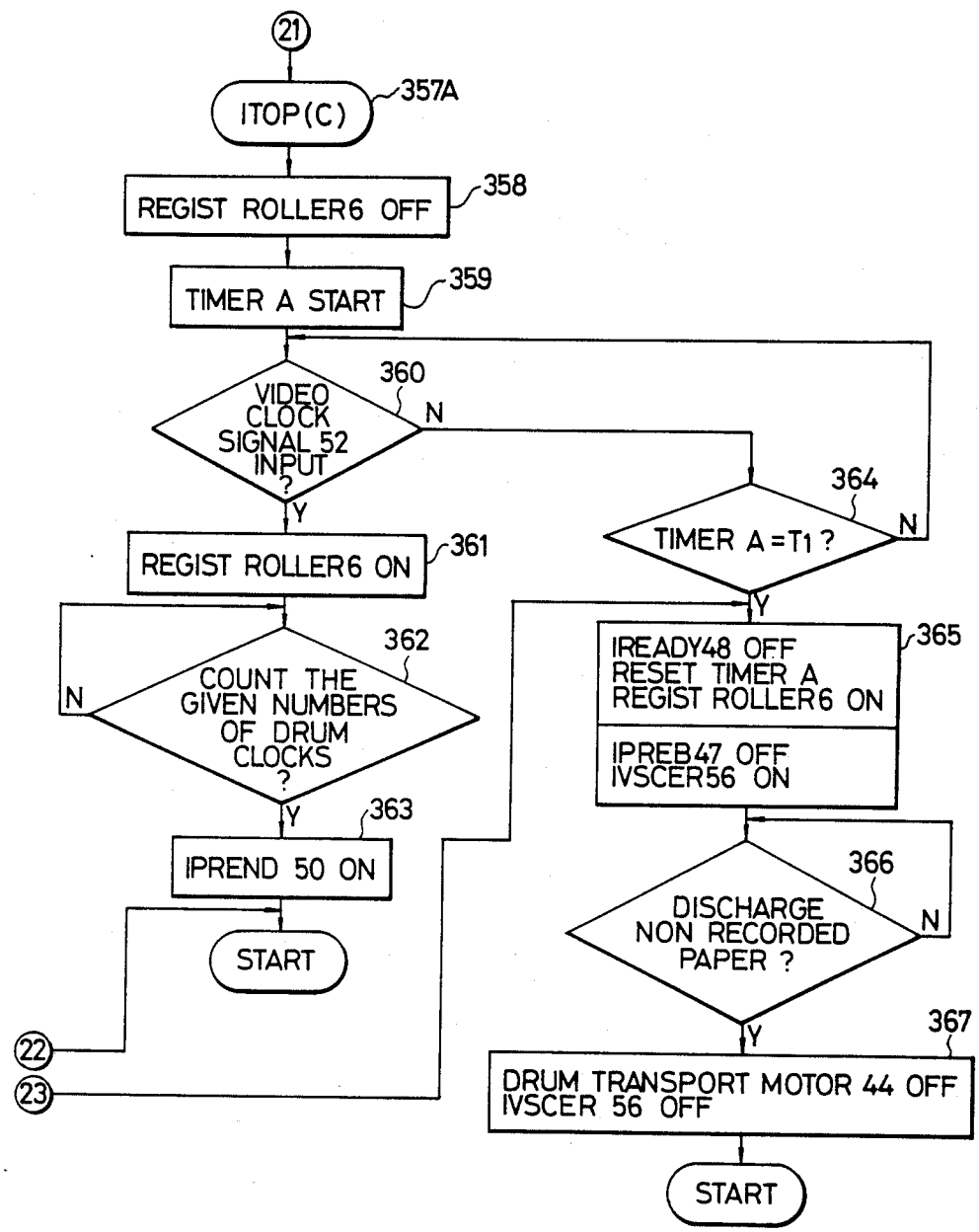

Now reference is made to FIGS. 16 and 17, respectively showing the function timing and the control flow in the VIDEO CLOCK synchronization mode.

Steps 330 to 338 will be omitted from the following explanation as they are same as the steps 130 to 138 explained in FIG. 10. In the aforementioned ITOP synchronization mode, the image information is transmitted in response to the signal ITOP requesting the transmission of the image information, to be supplied from the recorder 3 to the recording information generator 1. In the VIDEO CLOCK synchronization mode, however, the image information is transmitted together with a signal VIDEO CLOCK2 (52) from the recording information generator for indicating the start of output of the image information, and said signal VIDEO CLOCK is utilized as a synchronization signal for releasing the video signals to the recorder 3. Consequently the recorder 3 adjusts the image recording position on the recording sheet by means of the regist. roller 6. The recording information generator 2 is required to release said signal VIDEO CLOCK2 (52) at a timing the same as or subsequent to the output timing of the signal ITOP in said ITOP synchronization mode, since the entire visible image on the photosensitive drum 10 may not be transferred onto the recording sheet if the image information is transmitted prior to said output timing of the signal ITOP. In order to prevent such phenomenon there may be employed a method of releasing the signal VIDEO CLOCK2 (52) together with the image information VIDEO2 (37) from the recording information generator 2 after the lapse of a determined period from the output of the signal IPRNST (33), or a method of releasing said signal ITOP (46) from the recorder 3 (corresponding to the aforementioned steps 111, 119), thus advising the recording information generator 2 that the recording sheet has reached a position 16 corresponding to the start of laser recording, whereby the recording information generator 2 releases the signal VIDEO CLOCK2 (52) and the image information VIDEO (37) at an arbitrary timing within a determined period after the entry of said signal ITOP (46).

As in the aforementioned ITOP synchronization mode, there can be considered two cases G and H as will be explained in the following.

In the case G, in which the distance between the positions 17 and 18 is equal to or shorter than the distance between the center of the regist. roller 6 and the position 18 as in the case A, the control procedure is same as that in the case A in the ITOP synchronization mode, until the recording sheet reaches the ITOP position (step 357A), wherein the steps 116, 117 and 118 respectively correspond to steps 355, 356 and 357. Upon arrival of the recording sheet at the ITOP position, the regist. roller is stopped and the recorder awaits the entry of the signal VIDEO CLOCK2 (52) from the recording information generator 2 (step 358). The timer A is started at the same time (step 359). The signal VIDEO CLOCK2 (52) subsequently entered is latched in a flip-flop F/F53 and entered to the CPU 40 (step 360). The CPU 40 activates the regist. roller 6 (step 361), and the recording information generator simultaneously releases the image information VIDEO2 to effect the recording. Said flip-flop FF53 is reset by the signal IPREND (56) at the end of image recording. The recorder 3 activates the timer A at the arrival of the recording sheet at the ITOP position, in order to inspect a failed entry of the signal VIDEO CLOCK2 (52) due for example to a failure in the recording information generator 2, thus avoiding the sheet jamming in the recorder 3. If the timer A reaches a determined period T1 without the entry of the signal VIDEO CLOCK2 (52) (step 364), the regist. roller 6 is activated to discharge an unused recording sheet to the tray 13 according to the sheet discharge procedure, and the CPU 40 turns off the signal IREADY (48) and releases the signal IVSCER (56) indicating the absence of entry of the signal VIDEO CLOCK2 (52), thus advising the recording information generator of the abnormal situation (step 365). When the unused recording sheet passes the discharge sensor 19 (step 366), the drum transport motor 44 and the signal IVSCER (56) are turned off (step 367) and the program returns to the start.

In the case H in which the distance between the positions 17 and 18 is longer than the distance between the center of the regist. roller 6 and the position 18 as in the case B, a determined number of the drum clocks are counted (step 340), and the timers A and B are started when the recording sheet reaches the determined position (step 341).

The CPU 40 measures, by the timer B, a period T2 from the output of the signal ITOP (step 340A) to the entry of the signal VIDEO CLOCK2 (52) (step 343), since the signal ITOP is generated when the front end of the recording sheet reaches a determined position between the regist. roller 6 and the paper feed roller 7. If the signal VIDEO CLOCK2 (52) is not entered before the paper feed roller is stopped (step 352), said roller is stopped (step 353) and the counting operation of the timer B is terminated (step 354), since the recording sheet no longer moves thereafter. When the signal VIDEO CLOCK2 (52) is received in the step 342, the counting operation of the timer B is terminated (step 343) but the recording sheet continues to be transported until the paper feed roller is stopped (steps 344, 345). The timer A is reset in the step 343. In case the program proceeds through the steps 352, 353, no actual operations are conducted in the steps 344 and 345. Since the recording sheet is already transported, when the feed roller is stopped, from the position 16 for a distance corresponding to the time T2 counted by the timer B, the regist. roller 6 is activated (step 348) after the lapse of said period T2 (step 346), thus registering the front end of the recording sheet with the start position of laser recording on the photosensitive drum. In case the signal VIDEO CLOCK2 (52) is not entered after the lapse of the period T1 counted by the timer A (steps 342, 351), the program proceeds to steps 365 to 367 for returning to the start after a same procedure as in the aforementioned case G.

Figure 18:
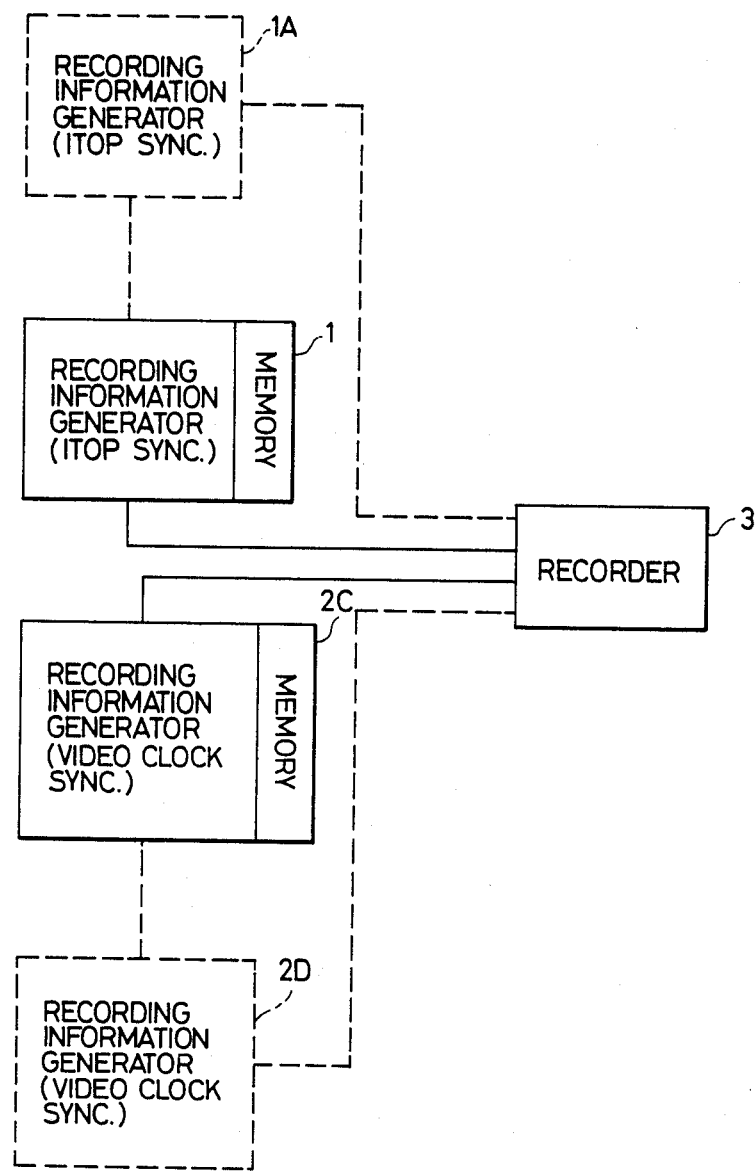
FIG. 18 is a block diagram showing the connection of a recording unit with plural recording information generating units, including that for the VIDEO CLOCK synchronization mode.

The counting operation of the drum clock signal 42 and the timer counting operation are conducted by interruption procedures (steps 368, 369). The timers utilize interruptions of a regular interval, for example the real-time clock signals. The steps 362 and 363 in the case E correspond to the steps 120 and 115 in the aforementioned case A, and the steps 349 and 350 in the case H correspond to the steps 114 and 115 in the aforementioned case B. FIG. 18 shows an example of connection of the recording unit 3 with plural recording information generators, wherein the generators 1 and 1A are of the ITOP synchronization mode while the generators 2C and 2D are of the VIDEO CLOCK synchronization mode.

The above-described structure automatically starts the information recording sequence utilizing the recording information output signals inevitably required in the recording information generator, thus allowing to simplify the structure of the recording information generator and alleviating the load thereof.

The present invention is not limited to the foregoing embodiments but is subject to various modifications within the scope of the appended claims.

What is claimed is:

1. A recording apparatus comprising:
   a recording unit for image recording on a recording material;
   a recording information generating unit for generating a recording material feeding signal;
   feeding means for feeding the recording material in response to the recording material feeding signal generated from said recording information generating unit; and
   means for automatically discharging the recording material in case a determined signal relating to recording information is not generated from said recording information generating unit within a determined period after the generation of the recording material feeding signal.

2. A recording apparatus according to claim 1, further comprising means for signalling said recording information generating unit to inform said automatic discharge of the recording material.

3. A recording apparatus according to claim 1, further comprising means for prohibiting new recording during the automatic discharge of the recording material.

4. A recording apparatus according to claim 1, wherein said determined signal is a signal indicating the start of sending of recording information.

5. A recording apparatus according to claim 4, wherein said feeding means controls the start of conveyance of the recording material in response to said determined signal so that an image is formed at a predetermined position on said recording material.

6. A recording apparatus according to claim 5, wherein said recording material is a recording sheet, wherein said recording unit has a recording medium on which an image is formed in response to the recording information transmitted by said recording information generating unit, wherein said recording unit also includes means for transferring an image formed on the recording medium onto the recording sheet at a predetermined transfer position, and wherein said feeding means controls the conveyance of the recording sheet in response to the determined signal so that the conveyed recording sheet has a predetermined positional relationship to the image formed on said recording medium.

7. A recording apparatus comprising:
   a recording unit for image recording on a recording material;
   a recording information generating unit for generating a recording material feeding signal;
   feeding means for feeding the recording material in response to the recording material feeding signal to be generated by said recording information generating unit; and
   means for retaining and suspending of the recording material at a predetermined position in case a determined signal concerning recording information is not generated by said recording information generating unit within a determined period after the generation of the recording material feeding signal.

8. A recording apparatus according to claim 7, further comprising means for resuming image recording on the recording material when the determined signal is generated while the recording material is retained and suspended at the determined position.

9. A recording apparatus according to claim 7, further comprising means for signalling said recording information generating unit that the recording material is suspended and retained at the determined position.

10. A recording apparatus according to claim 7, wherein said determined signal is a signal indicating a start of sending of recording information.

11. A recording apparatus according to claim 10, wherein said feeding means controls the start of conveyance of the recording material in response to said determined signal so that an image is formed at a predetermined position on said recording material.

12. A recording apparatus according to claim 11, wherein said recording material is a recording sheet, wherein said recording unit has a recording medium on which an image is formed in response to the recording information transmitted by said recording information generating unit, wherein said recording unit also includes means for or transferring an image formed on the recording medium onto the recording sheet at a predetermined transfer position, and wherein said feeding means controls the conveyance of the recording sheet in response to the determined signal so that the conveyed recording sheet has a predetermined positional relationship to the image formed on said recording medium.

13. A recording apparatus comprising:
a recording unit for image recording on a recording material in accordance with recording information;
entry means for entering the recording information, for entering a recording material feeding signal and for entering a predetermined signal relating to the recording information;
feeding means for feeding the recording material in response to the recording material feeding signal entered from said entry means; and
means for automatically discharging the recording material in case the pre-determined signal relating to recording information is not entered from said entry means within a pre-determined period after entry of the recording material feeding signal.

14. A recording apparatus comprising:
a recording unit for image recording on a recording material in accordance with recording information;
entry means for entering the recording information, for entering a recording material feeding signal and for entering a predetermined signal concerning the recording information;
feeding means for feeding the recording material in response to the recording material feeding signal entered from said entry means; and
means for retaining and suspending the recording material at a pre-determined position in case the pre-determined signal concerning the recording information is not entered from said entry means within a pre-determined period after entry of the recording material feeding signal.

* * * * *